VERIFICATION SYSTEM

Filed June 1, 1955 7 Sheets-Sheet 1

INVENTORS
EDWARD J. SCHMITT
& SPENCER W. SPAULDING
BY Morris A. Rabkin
ATTORNEY

INVENTORS
EDWARD J. SCHMITT
& SPENCER W. SPAULDING
BY Morris A. Rabin
ATTORNEY

INVENTORS
EDWARD J. SCHMITT
& SPENCER W. SPAULDING
BY Morris A. Rabkin
ATTORNEY

INVENTORS
EDWARD J. SCHMITT &
SPENCER W. SPAULDING
BY Morris Rabin
ATTORNEY

INVENTORS
EDWARD J. SCHMITT &
SPENCER W. SPAULDING
BY Morris A. Rabkin
ATTORNEY

INVENTORS
EDWARD J. SCHMITT &
SPENCER W. SPAULDING
BY Morris A. Rakkin
ATTORNEY

INVENTORS
EDWARD J. SCHMITT &
SPENCER W. SPAULDING
BY Morris L. Rabkin
ATTORNEY

United States Patent Office 2,861,744

Patented Nov. 25, 1958

2,861,744

VERIFICATION SYSTEM

Edward J. Schmitt, Collingswood, and Spencer W. Spaulding, Haddonfield, N. J., assignors to Radio Corporation of America, a corporation of Delaware Application June 1, 1955, Serial No. 512,382

21 Claims. (Cl. 235—61)

This invention relates to digital computing systems, and particularly to a verification system for an arithmetic operation.

Digital computing machines, whether employed in commercial or scientific applications, require accurate and dependable results. To achieve this accuracy, many digital computing machines make use of various coding forms which are susceptible to error checking. For example, a certain redundancy is usually introduced into these coding forms to provide what is termed a parity check. This redundancy may, for example, take the form of adding a single binary bit to a binary code such that the number of ones in every binary representation is always odd or always even, as desired.

A parity check system is quite satisfactory in the data transferring and handling phases of a computing system. But when coded numbers are added or subtracted it is often desired to achieve a certainty of the accuracy of the result greater than that afforded by the redundancy method. Thus the redundancy code, if one is used, is usually dropped during arithmetic operations and restored on completion thereof.

Many systems have been devised to achieve a satisfactory check upon these arithmetic operations. One such system ignores the redundant parity information and performs each particular arithmetic operation in two separate arithmetic units simultaneously. A comparison of the two results then provides the combined verification. However, the duplication causes an increase in the amount of equipment required.

Other verification systems perform the same arithmetic operations in subsequent machine cycles. Such a repetitive system requires additional machine time, and also fails to provide an entirely satisfactory verification of the result, since the same error could occur each cycle.

Accordingly it is an object of this invention to provide an improved system for verifying the results of an addition or subtraction of coded characters.

Another object of this invention is to provide a system which verifies not only the sum of coded characters, but also the parity bit, if used, and the carry bit when present.

A further object of this invention is to utilize much of the same equipment to provide the sum or difference of encoded characters and to check this sum or difference.

Still another object of this invention is to provide an improved device for adding or subtracting binary coded numbers which device makes use of a unique comparator arrangement.

A further object of this invention is to automatically add, subtract and verify quantities simply and efficiently at a high rate of speed which system may operate in conjunction with an information handling system having a timed and sequential operation.

Yet another object of this invention is to provide an improved verification system, which system is operative with any type of binary coding.

In accordance with one embodiment of this invention, operands to be added are placed in registers having 0 and 1 outputs. The operands (1 outputs from the input registers) are first added in a three-input adder and the sum stored in an adder output register. Next the binary complements of the original operands (0 outputs from the input registers) are added. A comparison made between the result of the second addition and the binary complements of the first addition (0 outputs from the adder outputs register) will, if equality is found, indicate no error. Thus much of the same equipment which is used to provide the final result is also used to accept the complement of each of the original operands, perform the operation a second time with apparently different operands, and compare the results by a unique comparator arrangement for equality, all within one machine cycle.

In another embodiment of this invention, the basic verification scheme set forth above is employed in a computing system adopted to handle variable, non-standard maximum length items. In this latter system, an alpha-numeric binary coded decimal character in excess three code is employed. Each operation is carried out in a time sequence of a number of operative steps. The sign of each operand is placed adjacent to the least significant character of the operand. The signs of the operand are recognized and operated on first. A provisional minus result is assumed when the operands have unlike signs. Characters from the two operands are then successively added or subtracted, starting with the least significant characters. Result characters from each addition or subtraction together with the possible carry signals as well as the odd parity are checked during each operation without any delay of machine time.

Verification is accomplished in accordance with the basic scheme set forth above by the use of the complements of the input operands. One addition is performed with the original operands, and another with the complements. The result of the first addition is compared with the result of the second addition as before. If equality is indicated, the result characters are stored in sequence in a memory, each carry signal being employed in the addition of the next pair of characters. The ends of the operands are detected and may be employed with a remaining carry to terminate an operation, or to initiate an end-around-carry sequence.

Each operation is carried out in a timed sequence having a number of operative steps. Separate steps such as complementing before the addition, in order to effectuate a carry, and end-around-carry, may be undertaken or omitted as required by the circumstances. Another feature of this invention is that the verification scheme verifies not only the sum or difference, but also the parity bit, the remaining bits of the alpha-numeric code employed, and the carry bit.

The novel features of this invention as well as the invention itself, both as to its organization and method of operation, will best be understood from the following description, when read in connection with the accompanying drawings, in which like reference numerals refer to like parts, in which.

Figures 3, 4, 6:
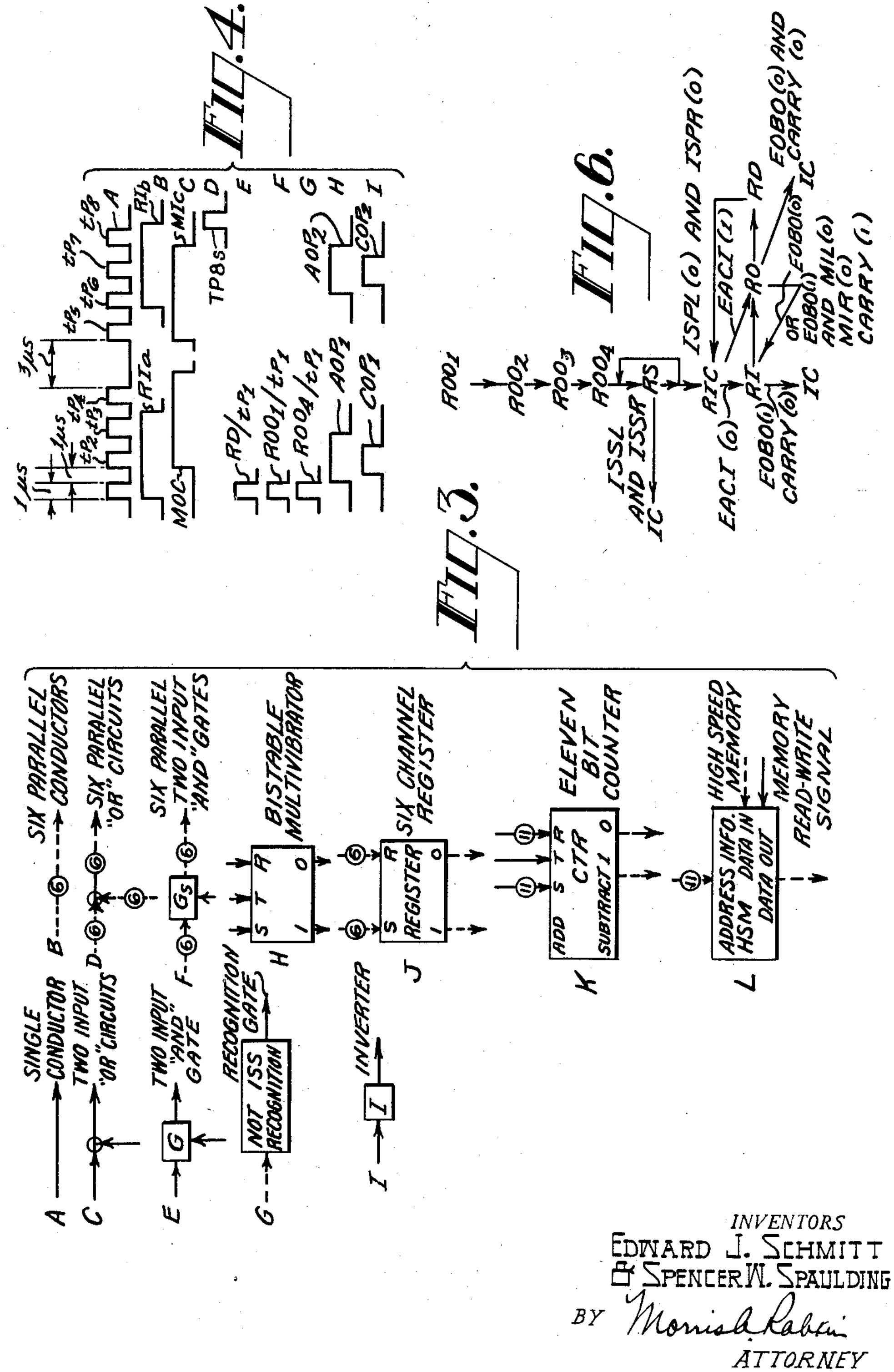

Figure 3 comprising Figures 3A to 3L is a legend identifying the notations employed in a detailed representation of the system.

Figure 4 comprising Figures 4A to 4I is a timing diagram for various signals employed in the operation of this system.

Figure 2:
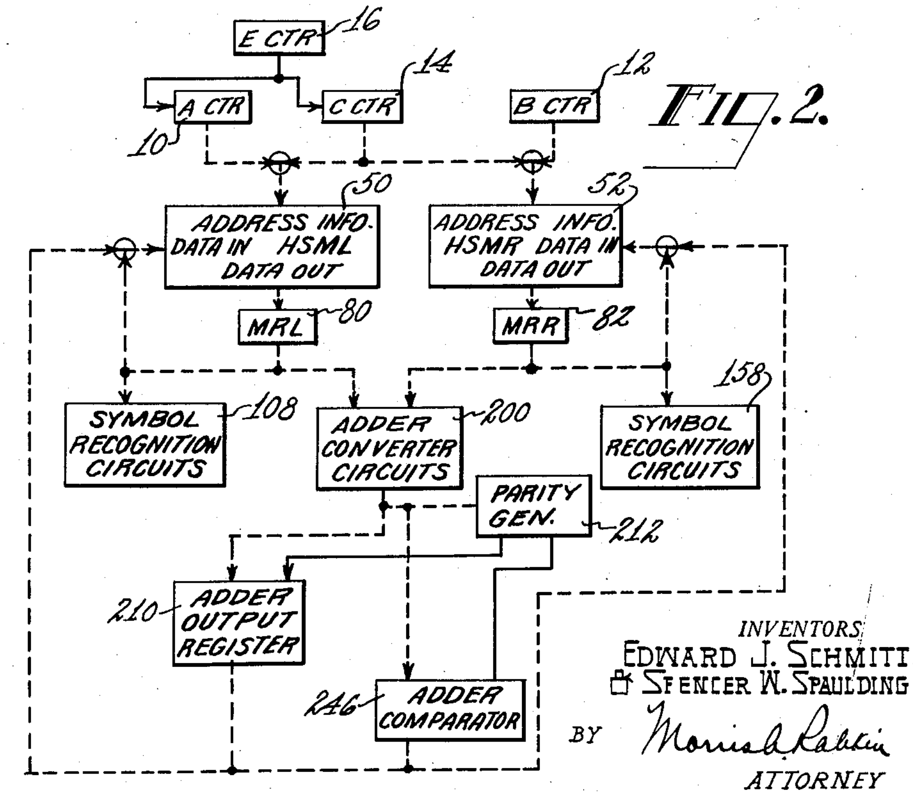
Figure 2 is a generalized block diagram of a system for practicing the invention, including operation control circuits and adder and subtracter circuits.
Figure 5:
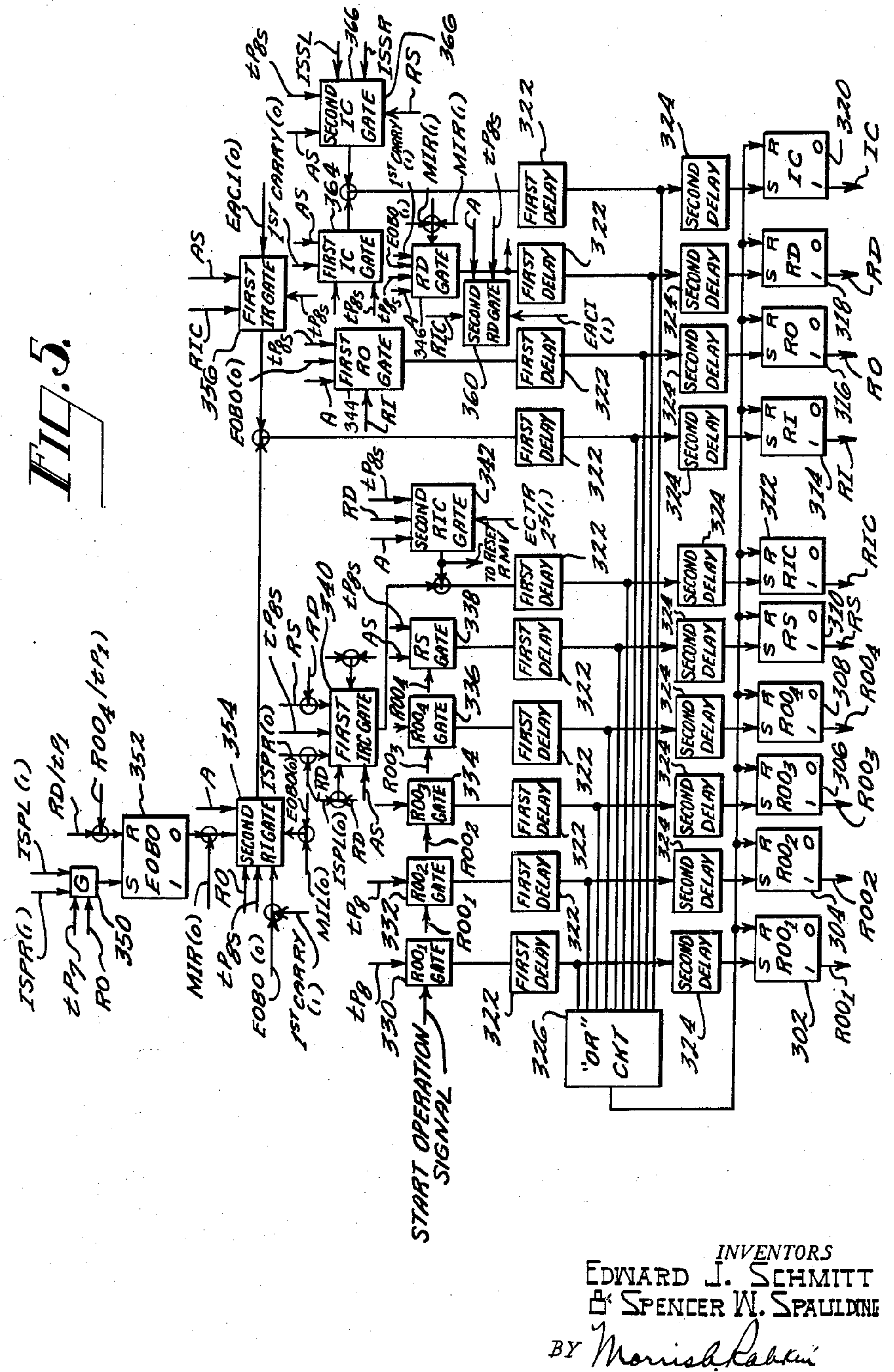

Figure 5 is a block diagram of an arrangement which may be employed for the operation control circuits of Figure 2.

Figure 6 is a flow diagram illustrating the operation of the status level generator.

Figure 7A:
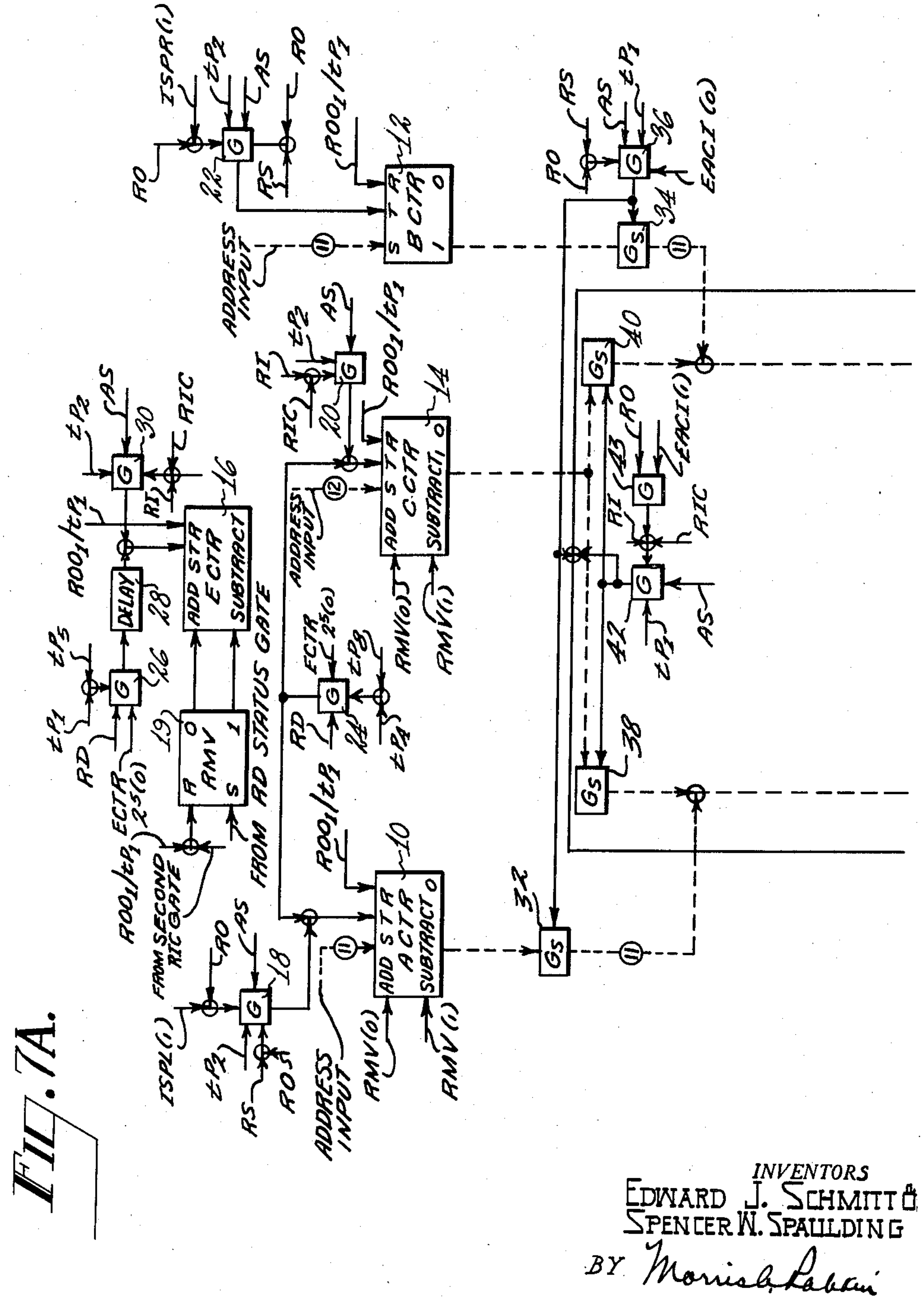
Figure 7B:
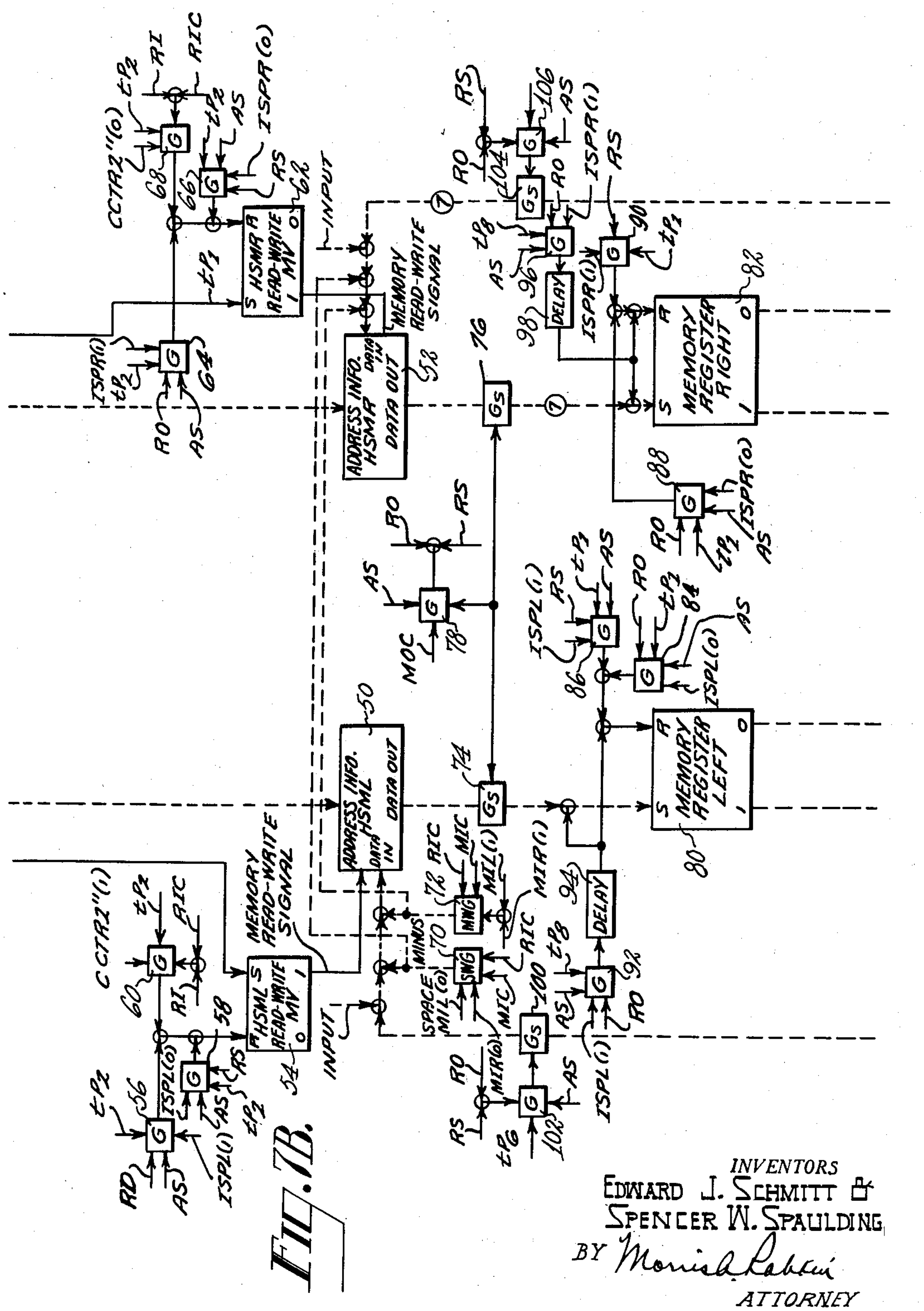
Figure 7C:
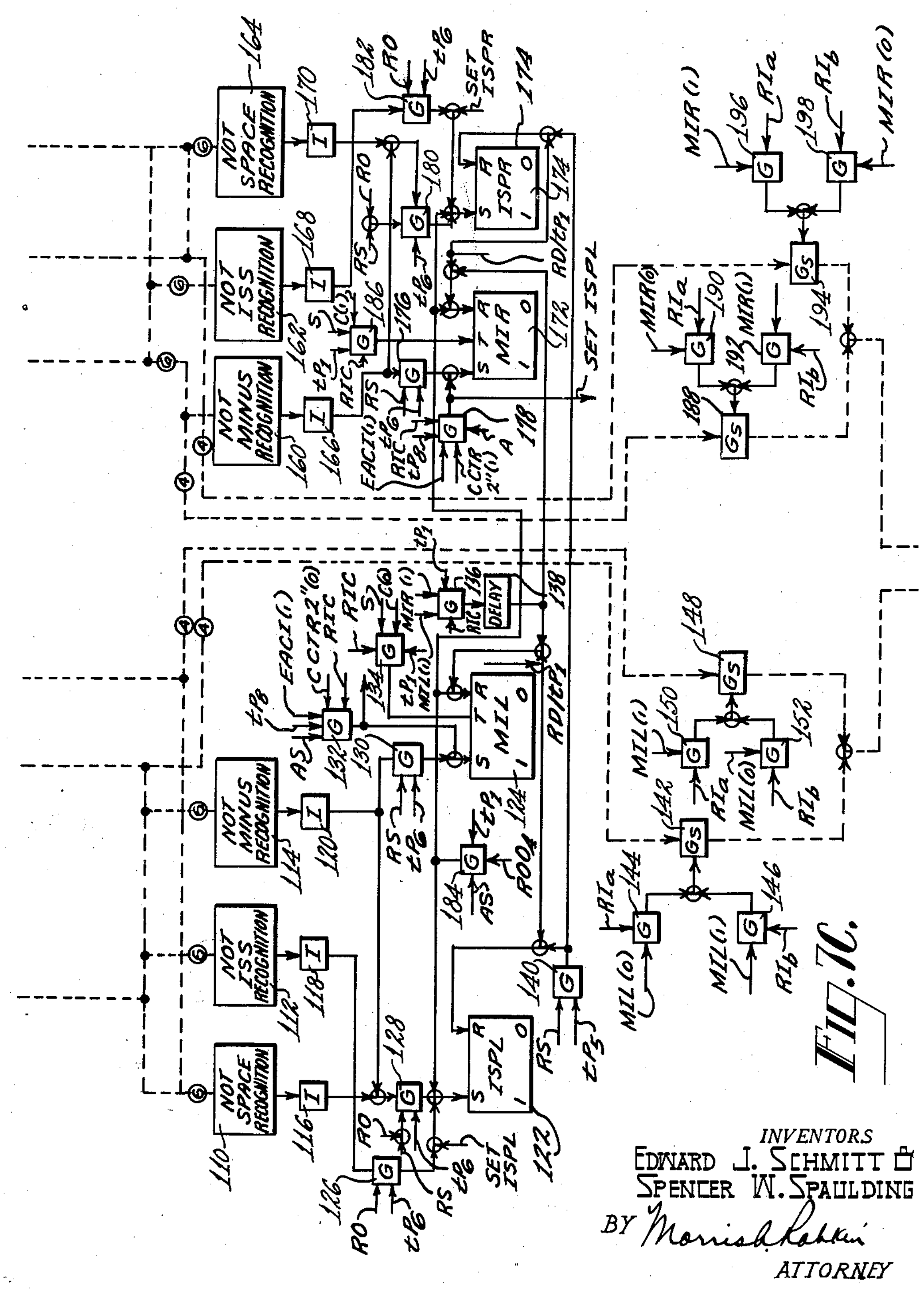
Figure 7D:
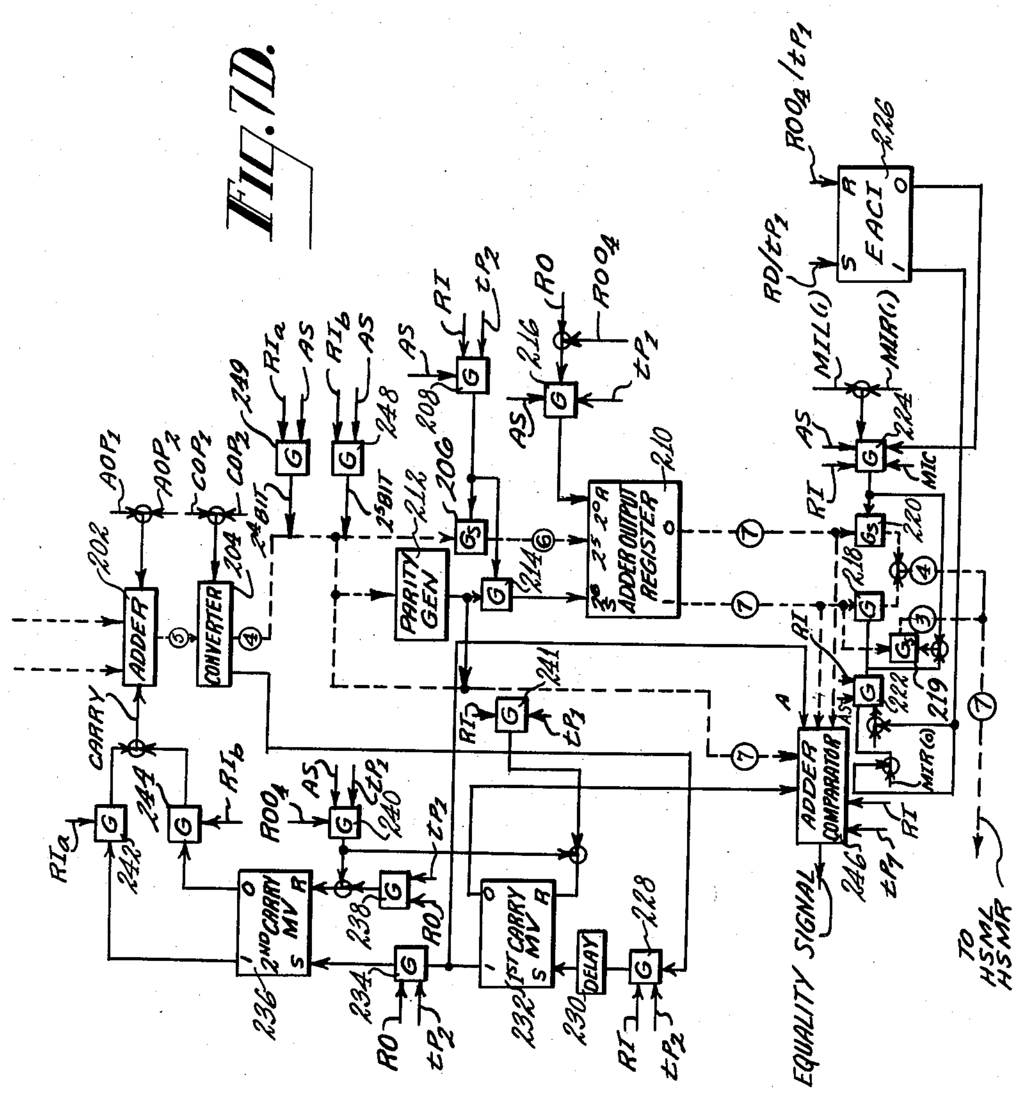
Figure 8:
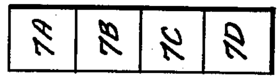

Figure 7, comprising Figures 7A to 7D inclusive, is a block diagram of the detailed arrangement of a verification scheme for use in the particular computing system shown in Figure 2. When placed together in proper order, Figure 7A is at the top, with Figure 7B immediately below; Figure 7C is below 7B, and Figure 7D is at the bottom below Figure 7C, and Figure 8 is a schematic representation of the way in which Figures 7A to 7D inclusive should be assembled.

INDEX

The following is an index to the principal parts of the present specification within which each of the parts is similarly identified:

I. Arithmetic Operations And Codings Employed
II. Components Employed
III. Adder, Subtractor Verification System
A. Detailed Arrangement
B. System Operation
IV. Computing System Utilizing Adder Verification System
A. Status Levels and Timing Signals
B. Detail Arrangement
C. Conditions of Operation
D. The Status Levels
E. System Operation
F. Other Operations of the System
V. Conclusion

*I. Arithmetic Operations and codings employed*

Whereas the invention is not limited to use with any particular coding system, during the explanation contained herein, two specific coding systems will be employed. The first of these, which will be utilized in conjunction with part III, is the pure binary system. This code system which is well known represents various numbers by bits corresponding to the powers of two.

The term binary coded number is intended to include not only such representations in binary form as binary coded decimal numbers, but also the representation in binary form of any number in any of the binary codes, including a pure binary.

However, in part IV when the adder verification system is described in conjunction with a computing system, a modification of the pure binary code is employed. This modification is called the excess three binary code. In this instance, we may assume the use of a code in which each character such as a letter of the alphabet, a special symbol or decimal number from 0 to 9 may be represented by a six binary bit combination. The four least significant bits form the numerical portion of the number. If an excess three-code is employed with this scheme, the four least significant binary bits of a number are three greater than the pure binary equivalent of the number. For example:

Decimal 0=010011
Decimal 1=010100
Decimal 2=010101

The binary-coded decimal form represents a multi-digit decimal number by a series of coded binary equivalents. The least significant numerical characters of a grouping may be placed first, with the other numerical characters of successively higher order following in succession. The binary digits ("bits") of like order for the various characters are placed in the same row or digital position.

The least significant numerical character of a grouping may be preceded by a special character or symbol denoting the sign of the quantity. The sign characters employed are the minus (Mi) and blank (space or Sp) symbols. When used to indicate sign, the Sp symbol represents a positive sign. The most significant numerical character of a grouping may be followed by a special character or symbol to denote the termination of the grouping (item separator or IS symbol) or a blank (space or Sp symbol). Such special symbols are here termed end of operand symbols. Placement of the sign characters on the right permits flexibility in the tabulation and representation of information.

The arithmetic operations are performed by the usual techniques employed when operating upon binary coded numbers. The scheme employed in accordance with this invention to check these arithmetic operations makes use of certain properties of numbers. Thus in the pure binary system, two numbers and a carry may be added to yield a binary sum. To verify this sum, the addend and augend are both complemented with respect to the radix minus one, that is "one" in the binary numbering system. Also, the carry is complemented. The complemented addend and augend are then added to the complemented carry. The result (sum) of this verification addition, if both additions were performed correctly, should be the binary ones complement of the original sum. Thus, by way of illustration, to add and verify, the sum of 0101 and 1100 (5 and 12), the addend, augend, and carry (which is generally zero (0) in the binary case) are first added to produce the sum 10001 (17). Next the complements of the addend, augend, and carry, which are 1010, 0011, and 1 respectively, are added to yield the sum 01110. It will be noticed that this second (verification) sum is the binary ones complement of the original (first) sum. Thereby a checking technique is made possible.

The computing system to be described in Part IV utilizes a binary coded decimal excess three code. In this system the arithmetic operation of subtraction is performed by the nines complement method. The nines complement of an individual number is the difference between the number and nine; thus, the nines complement of two is seven. Subtraction is performed by adding the nines complement of the subtrahend to the minuend, with a simple correction. For example, to subtract two from eight; the nines complement of two, which is seven, is added to eight, giving the sum of five and a carry in the binary-coded decimal system. The correction consists of discarding the carry digit and adding one, to secure the correct result of six. This correction is sometimes called "end-around-carry."

Subtraction by nines complement may also be performed in the binary-coded decimal excess three system. To subtract 0101 from 1011 (two from eigth), the nines complement of 0101 must be added to 1011. Nines complementing is particulary easy with an excess three code, because the nines complement is obtained by complementing each binary digit of a combination. Thus, in the following examples:

Decimal 0=0011, complemented=1100=decimal 9
Decimal 2=0101, complemented=1010=decimal 7
Decimal 8=1011, complemented=0100=decimal 1

When 1010 (7, or the complement of two) is added to 1011 (decimal 8) the difference of 10101 is obtained. The sum is corrected for the excess three code by adding 0011 (decimal three). Next the end-around-carry sequence is carried out by adding 0001 (decimal one), as the end-around-carry and dropping the highest order digit. The result is therefore the correct excess three code equivalent (1001) of decimal six.

To make the operation in the binary-coded decimal system more clear, the following example is provided:

```
 426= 426
-268= 731 (nines complement)
     1157 +end-around-carry
      158
```

A fuller description, and further examples, will be provided in the description of a particular system and its operation in part IV.

*II. Components employed*

A group of diagrams, in the nature of a legend (refer to Fig. 3), have been provided to illustrate the conventions employed in the drawings. These conventions have been employed for simplicity and clarity.

Fig. 3A shows a single conductor, used here in conventional fashion. Fig. 3B, however, shows the manner in which a number of parallel conductors are represented as a dotted line having an inset circle enclosing a number designating the quantity of parallel conductors (here six).

An "or" circuit (refer to Fig. 3C) is shown by converging arrows within a circle. "Or" circuits are well known. Such circuits have a plurality of inputs and provide an output signal when input signals are present on any one or more of the inputs. When a number of parallel channels or conductors are connected to a corresponding number of conductors through "or" circuits, the representation of Fig. 3D is used. Fig. 3D represents six parallel "or" circuits, each coupling a different channel of one group of conductors to a corresponding channel of another group of six conductors.

A single "and" gate is shown (refer to Fig. 3E) by a rectangle having an inner letter "G." An "and" gate, or coincidence gate, may have two or more inputs and provides an output signal when, and only when, input signals are present on all of its inputs. A plurality of parallel "and" gates are represented (refer to Fig. 3F) by a rectangle having an inner "Gs." The term parallel is here used to denote a group of like elements which are simultaneously operable.

A component employed within the present system for recognizing one of a number of signal combinations is a recognition gate. A recognition gate (Fig. 3G) may "recognize" the absence of a particular signal combination. Thus, in logical terms, a recognition gate may indicate by a high level output the absence of an ISS combination, that is, the presence of "NOT ISS." To provide a signal indicative of the presence of an ISS combination, the output from the recognition gate may be inverted. The arrangement utilized may be as follows: if an 1100 output from a staticizer is to be detected, "or" together staticizer outputs in the pattern 0011, using the complement of each bit. The "or" circuit will provide a high level output except when the desired pattern (1100) is provided by the staticizer. When the output is inverted, a high level output is provided only on the presence of the 1100 combination.

Bistable multivibrators, or flip-flops, are well known in the art and may be employed for the representation of binary quantities. A bistable multivibrator (see Fig. 3H) has two sections, either one of the two sections having a high level steady state output at a given time. Each section has an input, and the output from the section is high when the corresponding input is impulsed. In one section, multivibrators may have a set (S) input and a "1" output terminal. In the other section, multivibrators may have a reset (R) input and a "0" output terminal. The multivibrator also may include a trigger (T) input, the application of signals to which reverses the outputs provided from the multivibrator.

A block with an inner I designates a signal inverting device (see Fig. 3I). The inverters employed may be any suitable type.

A register may be a group of multivibrators each of which staticizes a different binary digit in a character or other signal combination (refer to Fig. 3J). Although the multivibators in a register are arranged in parallel, a single designation corresponding roughly to that of an individual multivibrator is employed here. That is, a register is shown symbolically as having only individual set and reset inputs and "1" and "0" outputs. The multi-channel input and output lines, however, for each register are actually connected to the individual multivibrators for each digital position. The multivibrators in the register may be set or reset by individual signals applied simultaneously to the different inputs of the multivibrators. In this way a desired signal combination may be entered in the register. All multivibrators may be reset simultaneously by a reset signal from a single source.

Binary counters (see Fig. 3K) are also employed in the present system. Binary counters may comprise a chain of bistable multivibrators each of which includes a trigger input as well as reset and set inputs. A signal applied to a multivibrator trigger (T) input reverses the state of that multivibrator. The multivibrators in the chain are formed into a counter by coupling a given output of each multivibrator to the trigger input of the next succeeding multivibrator. As with the designations employed in the register, all the set and reset inputs and "1" and "0" outputs are shown by indicating multi-channel input and output lines to and from the S, R, I, and O terminals, respectively. A single channel is coupled to the trigger input, because pulses applied to the lowest order multivibrator increase the count provided by the counter by one. Again, however, the various multivibrators in the counter may be set or reset from a single channel or individually from different channels. The counter shown in Fig. 3K is a reversible counter having add and subtract inputs. After the application of the signal to the add input, the counter counts in ascending fashion. After the application of a signal to the subtract input, the counter counts each trigger input in descending fashion. Note that a binary quantity, such as an address for a memory, may be set into the counter by activating a desired combination of set and reset inputs with signals which blank out carry signals between the multivibrators.

Two high-speed memories are employed in the present arrangement, but are not described in detail. Each memory (refer to Fig. 3L) includes a number of character storage positions, at each of which may be stored seven binary digits. Each high-speed memory includes means for receiving address signal combinations and retaining (staticizing) the address until a read or write signal is applied. When operating, all the binary digits of a single character signal combination are written in or read out together. Before starting an addition or subtraction operation, the operands are stored at definite locations in each of the memories by the computing system either automatically or under control of the programmer.

*III. Adder vertification system*

Figure 1:
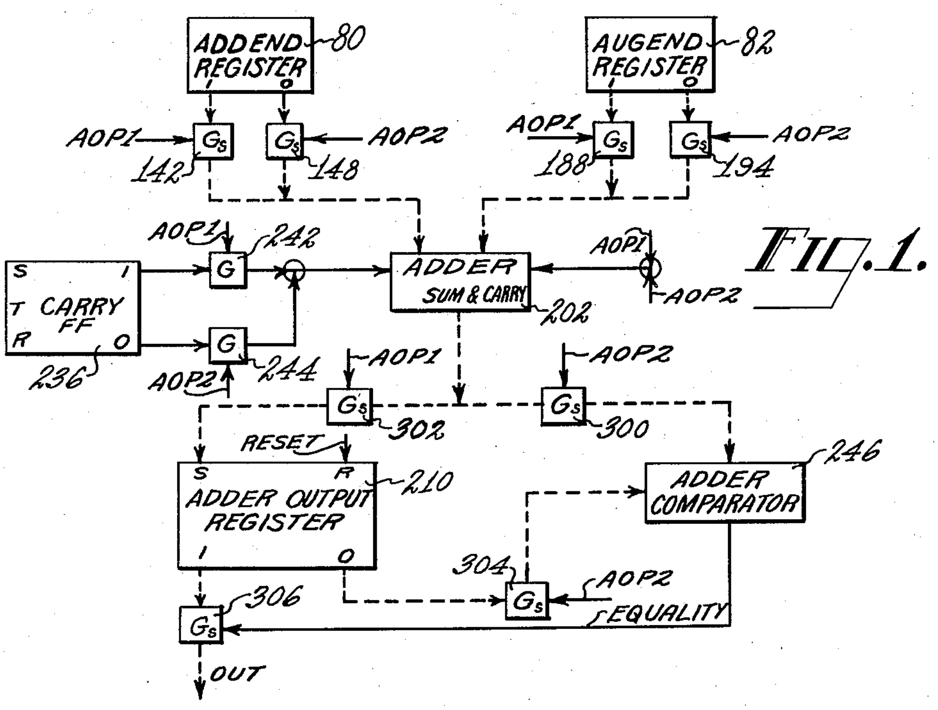
Figure 1 is a block diagram of one arrangement of an adder verification system in accordance with this invention.

Figure 1 sets forth a block diagram showing the basic essentials of an adder verification system in accordance with a feature of this invention. This particular adder and verification system has been described in an application entitled "Digital Computing Systems," Serial Number 477,975, filed December 28, 1954 by Edward J. Schmitt and James G. Smith, which application is assigned to the present assignee. Whereas only the basic essentials of the adder verification system are described with reference to Fig. 1, part IV of this specification will set forth in detail a complete description of an application of this invention to a digital computing system.

A. DETAILED ARRANGEMENT

In Figure 1, a register 80 has been designated for convenience as the addend register. Similarly, another register 82 has been designated as the augend register. The "1" outputs of the addend register 80 are connected through "and" gates 142 to one of the inputs of a three-input adder 202. Similarly, the "0" outputs of the addend register 80 are connected through "and" gates 148 to the same input of the adder 202 to which the "1" outputs of the addend register are connected. "And" gates 142 and 148 each receive their second inputs respectively from clock pulses herein designated as AOP1 and AOP2. These input pulses have been so designated for convenience and simplicity with the same designation as the adder output pulses which are shown and described with regard to Fig. 4. These two pulses may be thought of as any two sequential clock pulses which occur in succession.

In a similar manner, the "1" and "0" outputs of the augend register 82 are connected through "and" gates 188 and 194, respectively, to a common input of the adder 202. Likewise, "and" gates 188 and 194 receive their second inputs from the AOP1 and AOP2 clock pulse sources, respectively. The carry input to the three-input adder 202 is provided by what is herein designated as a carry flip-flop 236. For illustration purposes, with regard to Fig. 1, it will be assumed that this carry flip-flop remains in a set condition supplying continuous high and low level outputs at the "1" and "0" outputs, respectively. The "1" and "0" outputs, respectively, from the carry flip-flop 236 are connected through "and" gates 242 and 244, respectively, to the common carry input of the adder 202. "And" gates 242 and 244 respectively receive their gating input from the AOP1 and AOP2 clock pulse sources, respectively.

The binary adder, by way of example, adds two six binary bit inputs and a one binary bit carry input. For each bit positioned in the binary adder there may be employed a three input adder of the type shown on pages 276 and 277 of the book "High Speed Computing Devices" by Engineering Research Associates, Inc., published 1950 by the McGraw-Hill Book Company, Inc. The binary adder provides a pure binary sum of the binary bits inserted from the addend and augend registers. Only the pure binary case will be described in part III of this specification, for the sake of simplicity. The use of the adder verification system in a system employing binary coded decimal in excess three code is described in part IV hereof. Because the system as set forth in Fig. 1 is to utilize a pure binary representation, the output of the adder is herein shown by a single dotted line labeled sum and carry. The carry has no independent significance in the pure binary system.

The sum and carry output from the three input adder 202 is connected through "and" gates 302 to the set input of an adder output register 210 and through "and" gates 300 to one of the inputs of an adder comparator 246. The gating input to the "and" gates 302 is provided by AOP1 whereas the gating input to the "and" gates 300 is provided by AOP2. The reset input is provided by what is herein labeled as a reset signal. This input, may for example, be provided by TP1 as will be shown and described in part IV or may be any other suitable gating pulse occurring prior in time to AOP1. The "1" output of the adder output register 210 is coupled through "and" gates 306 to the output of the system which may, for example, be the high speed memory in a computing system, as is set forth in part IV. The "0" output of the adder output register 210 is coupled through "and" gates, 304 which receive the gating pulse AOP2, to supply the second input to the adder comparator 246. The output of the adder comparator 246 may be coupled to gate open the "and" gates 306 to permit the contents of the register 210 to be read out. In the alternative, the output of the adder comparator 246 may supply a signal for an alarm circuit to indicate correct (or incorrect) sums. The adder comparator 246 compares the output of the adder circuit 202 to the output of the adder output circuit 210. The adder comparator 246 signals if the two combinations are equal. An arrangement which may be employed as this comparator 246 is shown and described in a copending application entitled "Electronic Comparator," filed August 24, 1953, Serial Number 375,869 by Phillip Cheilik and assigned to the asignee in the present invention.

B. SYSTEM OPERATION

Assume, by way of example, that number 5, that is binary 0101, one of the numbers to be added, appears in the addend register 80. Similarly, the number 12, that is binary 1100, appears in the augend register. The carry flip-flop will normally be in a reset condition with the zero output high. Under these conditions upon the occurrence of AOP1, the numbers 5 and 12 are added by the adder 202, producing an output of 17, that is binary 10001. This result is transferred to the adder output register 210, this register having been previously reset.

Upon the cessation of AOP1 and the occurrence of AOP2, the "0" outputs of the addend and augen registers and carry flip-flop instead of the "1" outputs are connected to the adder. This effectively complements each of the three input quantities to the three input adder. Thus the number 5 is now binary 1010, the number 12 is now binary 0011, and the carry previously a zero is now binary 1. This result, or binary sum, 01110 is passed to the adder comparator 246 through the gate 300. It will be noted that this sum is the exact binary complement of the sum of the first addition. Simultaneously therewith (still during AOP2) the "0" output from the adder output register 210 is applied to the remaining input of the adder comparator 246 through "and" gate 304. Since this binary number passed through "and" gate 304 is the complement of the original sum, the comparison in the adder comparator 246 indicates equality. The equality signal which may be applied to "and" gate 306. In the event the equality signal is utilized to open "and" gate 306 the binary sum, having been checked for accuracy, is passed to the output circuit.

From this unique arrangement, it is noted that substantially identical equipment which is used to give the final result is also used to supply the complement of each operand, perform the operation a second time (with apparently different operands to the adder) and by means of a comparator circuit, compare the second result with the original result for equality. In this manner, the adder circuits check themselves. For example, if a gate is required to pass a binary "1" and this gate is not working, it will effectively pass a binary "0" into the adder. However, upon the check addition (the second addition) a different gate will be required to pass the complement of the previous binary "1" which is now a binary "0." Accordingly, this binary "0" will pass into the adder. Since the final results that are compared upon the complete complementing of both operands which has not occurred, the result cannot compare and no equality will be given. If on the other hand a gate is not working and it must pass the binary "0," the fact that this is the correct value to pass does not make any difference because this faulty gate will be detected on the second addition when it is required to pass a binary "1."

*IV. Computing system adder (using adder verification)*

This basic verification system set forth in part III is the system that is disclosed in the application entitled "Digital Computing Systems" by Schmitt et al., as mentioned above. The Schmitt et al arrangement may operate with a computing system which provides the requisite input data and utilizes the results obtained therefrom. Such computing system may be of the type described in a pending application for patent filed by L. S. Bensky, entitled, "Information Handling System," Serial Number 478,021, filed December 28, 1954 and assigned to the assignee of the present invention.

A portion of such a system is shown by a generalized block diagram in Fig. 2. The generalized block diagram is enclosed to aid in the understanding of the present verification system when used in a computing system employing binary coded decimal in excess three code. Figure 2 shows broadly the flow of information through the system. The great number of connections between the various units, and the considerable number of components within or associated with each unit, will be shown and described with reference to the detailed arrangement of the system as illustrated in Fig. 7.

With reference to Fig. 2, the arrangement employs two high-speed memory banks, designated HSML 50 (high-speed memory left) and HSMR 52 (high-speed memory right). The left memory HSML 50 receives address information from an A counter 10; the right memory HSMR 52 receives information from a B counter 12. Either of the two memories HSML 50 and HSMR 52 may receive address information from a C counter 14. A fourth, E counter 16 is coupled to both the A and C counters 10 and 14 and may control the operations of the A and C counters 10 and 14 under certain conditions.

The output of the left memory HSML 50 is directed through a memory register left (MRL) 80 to symbol recognition circuits 108 and to adder and converted circuits 200. The symbol recognition circuits 108 may detect and utilize the occurrence of the special terminating and sign indicating signals. The output of the left register MRL 80 may also be returned to a data input of the left memory HSML 50.

The adder and converter circuits 200 include a binary adder and a binary to coded-decimal converter. The binary adder, as herein employed, adds two four binary digit inputs and a one binary digit carry input. The binary adder, which may be a three-input adder of the type described above, provides a binary sum or difference to a binary to coded-decimal converter which changes the binary quantity to the binary-decimal code. A binary to coded-decimal converter is shown and described in a copending application for patent entitled, "A Code Converter," Serial No. 312,528, filed October 1, 1952, now abandoned, by I. H. Sublette and A. M. Spielberg, and assigned to the assignee of the present invention.

The right memory HSMR 52 is coupled to circuits in a fashion similar to that of the left memory HSML 50. The output of the right memory HSMR 52 is directed through a memory register right (MRR) 82 to the adder converter circuits 200 and to symbol recognition circuits 158. The output of the right register MRR 82 may also be returned as input data to the right memory HSMR 52.

The outputs of the adder and converter circuits 200 are directed to an adder output register 210 which is coupled to the inputs of both memories HSML 50 and HSMR 52. The checking arrangement comprises a parity generator 212 and an adder comparator 246 and functions basically as set forth in part III. The adder converter circuits 200 are coupled directly to the adder comparator 246 and are also coupled to the parity generator 212. Outputs of the parity generator 212 are coupled to the adder output register 210 and to the adder comparator 246. An output of the adder output register 210 is also applied to the adder comparator 246. A parity generator, such as parity generator 212, may provide an added binary digit to each character signal combination for checking purposes. Thus a six binary digit character signal combination, with parity bit added, becomes a seven bit combination. A suitable parity generator is shown and described in Patent No. 2,674,727 entitled "Parity Generator," issued to Arnold Spielberg on April 6, 1954. The adder comparator 246 compares the output of the adder converter circuits 200, including an added signal from the parity generator 212, to the output of the adder output register 210. The adder comparator 246 signals if the two combinations are equal.

As is well known, computing systems may place quantities which are to be operated upon at definite locations in the memories and may select automatically (or by program instruction) a point in the memories at which the result of the operation is to be placed. Computing systems may also "remember" the address of the two operands and the address of the result, and staticize these addresses when they are needed. Further, the computing system may direct which operation is to be performed and which of the two operands is to be placed in each of the memories. In operation, therefore, information to be utilized in an addition or subtraction is placed in the two memories HSML 50 and HSMR 52. The address of one operand is placed in the A counter 10, the address of the other operand is placed in the B counter 12, and the address of the result is placed in the C counter 14. In a sequence of timed steps, individual characters from each of the operands are read out of the memories HSML 50 and HSMR 52 to the registers MRL 80 and MRR 82. Information held in the registers MRL 80 and MRR 82 is utilized by the symbol recognition circuits to determine whether the information should be provided to the adder converter circuits 200. In accordance with the characters occurring in each of the operands the arrangement carries out different sequences of operations automatically to obtain final correct results. Characters which are added or subtracted in the adder converter circuits 200 are checked for correctness by performing a second complement addition or subtraction before being placed in the memory from the adder output register 210. The checking technique verifies not only the sum but also the parity bit, the carry bit, and the remaining bits of the alpha-numeric code.

The timed sequences of operations include a one in which an end-around-carry may be effected. In the end-around-carry operation the E counter 16 is employed in selecting the address of the least significant character in the result. Because the generalized diagram of Fig. 2 is intended only to identify some of the principal units of the arrangement and to provide a picture of the general information flow, no description of detailed operations is given at this point. The operations are described in detail in connection with the description of Fig. 7.

*A. Status levels and timing signals*

In an addition or subtraction operation, the system normally employs a succession of different status levels. Each status level represents a condition in which a certain predetermined group of components of the system are activated for transmitting or utilizing information in a sequence. The status levels may occur in a varying order, as the sequencing is in part under control of the operands. Each status level, however, although it may occur repetitively or several times in succession, consumes a definite interval of time.

During each status level a succession of timing pulses occur. The relationship of the timing pulses and the other timing signals of interest in this application is shown in the timing diagram of Fig. 4, comprising Figs. 4A to 4I.

The various status levels of interest in the present application are identified as follows: $ROO_1$, $ROO_2$, $ROO_3$, $ROO_4$, RS, RIC, RI, RO, RD, and IC. Each of these status levels is used for a particular function, or a number of functions, as will be described. Each status level, however, begins with $tp_1$ (Fig. 4A) and ends with $tp_8$ or $tp_{8s}$ (Fig. 4D). As shown in Fig. 4A, each timing pulse may be 1 $\mu$sec. in duration. The interval between the end of each timing pulse and the occurrence of the succeeding timing pulse is also 1 $\mu$sec., except that the interval between $tp_4$ and $tp_5$ is 3 $\mu$sec. The time intervals here given are merely illustrative of time relationships which may be employed in practicing the invention.

Such a sequence of timing pulses may be derived from a timing pulse generator operating continuously. The timing pulse generator, for example, may include a magnetic drum which provides a timing pulse from a timing track approximately once every 20 $\mu$sec. The timing pulse generator may also include a series of delay lines responsive to the timing pulses from the drum. Pulses in the above pattern, from $tp_1$ to $tp_8$, may be derived from taps taken in the series of delay lines.

During certain status levels and at certain times other timing signals are also desired. These timing signals may be derived from the basic sequence of timing pulses through the employment of gating, multivibrator, and delay arrangement. A signal designated $RI_a$ (see Fig. 4B) is desired as an adder input pulse during the RI status level starting with the beginning of $tp_1$ and terminating shortly after the end of $tp_3$. Another signal may be desired during the RI status level from the beginning of $tp_6$ to shortly after the termination of $tp_8$. The adder input pulses, which are to occur when "A" or "S" signals are present, may be derived by pulse stretching techniques or by the use of a bistable multivibrator. For example, using gates to determine the occurrence of the RI status level and that an "A" or "S" signal is present, $tp_1$ may be employed to set the multivibrator, and a delayed $tp_3$ may be employed to reset the multivibrator. The "1" output of the multivibrator then provides the desired $RI_a$ signal. In the same manner, an $RI_b$ signal may be provided in the start of $tp_6$ to shortly after the termination of $tp_8$.

A memory output clock pulse (MOC) and a memory input clock pulse (MIC) may be generated by like means during each of the status levels (see Fig. 4C). The memory output clock pulse MOC is provided from the start of $tp_2$ to shortly after the close of $tp_4$. The memory input clock pulse MIC is provided from the start of $tp_5$ to the start of $tp_8$.

During each of the status levels also, an additional $tp_{8s}$ signal may be provided (refer to Fig. 4D). As shown, $tp_{8s}$ may be a pulse of 1 $\mu$sec. duration beginning with the termination of $tp_8$. $Tp_{8s}$ may be employed for initiating the subsequent status level. Other signals may be employed during specific status levels for a reset function at the start of the status level. Thus a timing pulse which is specially employed at a number of points is $tp_1$ in the RD status level. This pulse, designated $RD/tp_1$, is shown in Fig. 4E. The $tp_1$ occurring during the $ROO_4$ status level is similarly used and, designated $ROO_4/tp_1$, as shown in Fig. 3G.

Adder output pulses are provided during certain intervals in each RI status level. The adder output pulses (see Fig. 3H) are designated $AOP_1$ and $AOP_2$. $AOP_1$ starts mid-way between the beginning of $tp_1$ and $tp_2$ and ends on the start of $tp_3$. $AOP_2$ starts mid-way between the beginning of $tp_6$ and $tp_7$ ends on the start of $tp_8$.

The converter output pulses ($COP_1$ and $COP_2$) are also provided (refer to Fig. 4I). The converter output pulses occur during the RI status levels when an "A" or "S" signal is provided. Dividing the time interval between the commencement of successive time pulses into quarters, $COP_1$ may be said to occur from 1¾ to 2¾, and $COP_2$ may be said to occur from 6¾ to 7¾ in the time pulse sequence.

An arrangement which may be employed for generating status levels in the desired sequence is shown in Fig. 5. A flow diagram showing the various changes of status levels is shown in Fig. 6. The changes of status levels will be described in detail in connection with the operation of the system. Briefly, however, (refer now to Fig. 5), the status level generator includes a number of bistable multivibrators, 302 to 320 each of which is set by a different status gate 330 to 366. The "1" output of each of the status level multivibrators 302 to 320 represents one different status level signal, from $ROO_1$ to IC. Accordingly, each of the multivibrators 302 to 320 is designated as an $ROO_1$, or other, multivibrator. When any one of these multivibrators 302 to 320 is set all the others are reset, so that only one status level signal may be provided at a given time. Not more than one of the number of gates 330 to 366 provides a signal at a time.

Each individual gate, e. g. 330, or group of gates, coupled to a status level multivibrator, e. g. 302, is also coupled, through a first delay line 322 to an "or" circuit 326. The output of the "or" circuit 326 resets each of the multivibrators 302 to 320. Signals provided from the various status gates 330 to 366 are also delayed in second delay lines 324 before being applied to the set input of the multivibrator 302 to 320 to which they are coupled. Therefore, when a change in status level is to occur, the signal which is provided from a status gate 330 to 366 is first delayed long enough (in the first delay line 322) to permit the activating pulse to expire. Then all multivibrators 302 to 320 are reset through the "or" circuit 326. The activating pulse, delayed in the second delay line 324 long enough to permit complete resetting, then sets only the desired status level multivibrator 302 to 320. For example, when an operation is to be commenced the computing system provides a start operation signal to the status gate 330 coupled to the $ROO_1$ multivibrator 302. A "1" output is provided only from the $ROO_1$ multivibrator 302, and this "1" output is the $ROO_1$ status level signal. To shift to the next status level, $ROO_2$, the $ROO_1$ status level signal primes one input of an "and" gate 332 coupled to the set input of the $ROO_2$ multivibrator 304. On the occurrence of the next $tp_8$, therefore, this last mentioned $ROO_2$ "and" gate 332 is fully activated and provides an output which, in the manner previously described, sets only the $ROO_2$ multivibrator 304. The above explanation is only a brief exposition in the manner in which status levels are changed. More complex relationships may determine other changes of status level, as will be brought out more fully below.

B. DETAILED ARRANGEMENT

The detailed arrangement of a computer adder, and checking system therefor, is shown in Fig. 7. For clarity and simplicity shorthand designations have been used to indicate input signals which are actually derived by connections between units. "Or" circuits are shown in the drawing, but not numbered. The conventions observed in the legend of Fig. 3 are used throughout Fig. 7. The various components will be referred to by abbreviations after descriptive names corresponding to the abbreviations have been set out.

Referring now to Fig. 7A, the system employs an A counter 10, a B counter 12, and a C counter 14. The A and C counters 10 and 14, respectively, are reversible and accordingly have add and subtract inputs. The A counter 10 and the B counter 12 have eleven channel address inputs and the C counter 14 has a twelve channel address input. A reversible E counter 16 is also employed. The add and subtract inputs of the A counter 10, the C counter 14, and the E counter 16 are controlled by signals from a reversing multivibrator (RMV) 19.

Trigger input signals for each of the counters 10, 12, 14, and 16 are derived from separate gating arrangements. Signals are provided to the trigger input of the A counter 10 from G18. Signals are provided to the trigger input of the C counter 14 from G20 and the trigger input of the B counter 12 receives signals from G22. Trigger input signals are also applied to the A counter 10 and the C counter 14 from G24. The E counter 16 receives trigger input signals from G26 through a delay line 28 and from G30. A counter 10 and C counter 14 trigger inputs applied from G24 are controlled by the value of the $2^5$ bit from the E counter 16.

The outputs of the A counter 10, the B counter 12, and the C counter 14 are directed to the high-speed memory left (HSML) 50 and the high-speed memory right (HSMR) 52 (Fig. 7B). The output signals are applied through gates which may be said to control the passage of signals between the two components. The output of the A counter 10 (referring again to Fig. 7A) is directed to HSML through G*s*32 while the output of the B counter 12 is directed to HSMR 52 through G*s*34. G*s*32 and G*s*34 are controlled by a separate gate G36. Outputs from the C counter 14 may be directed to HSML 50 through G*s*38 and to HSMR 52 through G*s*40. G*s*38 and G*s*40 are controlled by another gate G42.

The two high-speed memories HSML 50 and HSMR 52 (Fig. 7B) receive information from the counters of Fig. 7A. Read-write signals are applied to HSML 50 from an HSML read-write multivibrator 54. The HSML read-write multivibrator 54 may be set by signals from G36 or G42 and reset by any one of three gates, G56, G58, and G60. HSMR 52 read-write signals are applied from a HSMR read-write multivibrator which is set by signals from G36 or G42 and which may be reset by any one of three gates G64, G66, and G68.

Data may be supplied to HSML 50 and HSMR 52 through a Space write gate (SWG) 70 and a Minus write gate (MWG) 72. When fully activated, SWG 70 and MWG 72 generate the proper signal combinations for Space and Hinus symbols, respectively.

The output of HSML 50 is directed through Gs74 to the set inputs of a memory register left (MRL) 80. The output of HSMR 52 is directed through Gs76 to the set inputs of a memory register right (MRR) 82. Gs74 and Gs76 are controlled by a separate gate G78.

The reset inputs of MRL 80 are controlled by G84 and G86. The reset inputs of MRR 82 are controlled by G88 and G90. One given combination of signals, representing the quantity three, may be applied to the set and reset inputs of MRL 80 to write the quantity three into MRL 80. This given combination is derived from G92 through delay line 94. A similar combination of signals may be applied to certain of the set and reset inputs of MRR 82 through G96 and delay line 98.

Outputs from MRL 80 are returned to HSML 50 through Gs100. Gs100 is controlled by G102. Outputs of MRR 82 are returned to HSMR 52 through Gs104. Gs104 is controlled by G106.

In Fig. 7C are circuits for recognizing and utilizing special symbols occurring in the output of MRL 80 and other circuits for controlling the flow of signals from MRL 80 (Fig. 7B) to the adder 202 (Fig. 7D). Three recognition gates 110, 112, and 115 (Fig. 7C) are employed, each responsive to a particular combination of "1" and "0" signals from MRL 80 (Fig. 7B). The recognition gates are termed the Not SP recognition gate 110 (Fig. 7C), the Not ISS recogntion gate 112, and the Not minus recognition gate 114. Inverters (I) 116, 118, and 120 are coupled to the outputs of the recognition gates 110, 112, and 114, respectively. The significance of the output of a recognition gate is reversed by the coupled inverter, which inverts the signal provided. Thus the output of the several inverters 116, 118, 120 may be said to be Space, ISS, or Minus symbol detected signals.

An item separator or space left (ISPL) multivibrator 122 and a minus left (MIL) multivibrator 124 are also employed in the symbol recognition circuits of Fig. 7C. ISS detected signals from I118 are directed through G126 to the set input of ISPL 122. Space detected signals from I116 and minus signals from I120 set ISPL 122 through G128. Minus detected signals from I120 also set MIL 124 through G130. Further set signals for MIL 124 are derived from G132. G136 provides reset signals for MIL 124 through delay line 138. Reset signals are provided for ISPL 122 and MIL 124 from *Rd/tp*₁. Reset *signals* for ISPL 122 are also provided from G140.

The circuits which control the flow of signals from MRL 80 (Fig. 7B) to adder 202 (Fig. 7D) include Gs142, coupled to the "1" output of MRL 80, and Gs148, coupled to the "0" output of MRL 80. Although six bit outputs are provided from MRL 80 and MRR 82, only four of the bits (the four numerical bits $2^0$ to $2^3$) are directed to the adder 202. The outputs of Gs142 and Gs148 are combined together before being directed to the adder 202. Gs142 is controlled by G144 and G146. Gs148 is controlled by G150 and G152.

Symbol recognition gates are also employed in the right-hand side of the arrangement (see Fig. 7C). As on the left-hand side of the arrangement, three recognition gates are employed, these being a Not Minus recognition gate 160, a Not ISS recognition gate 162, and a Not Space recognition gate 164. The three recognition gates 160, 162, and 164 are responsive to particular combinations of signals from MRR 82 (Fig. 7B) and each provides an output to a coupled inverter 166, 168, or 170, respectively.

A minus right (MIR) multivibrator 172 (Fig. 7C) and an item separator or space right (ISPR) multivibrator 174 are employed in these symbol recognition circuits. Minus detected signals from 166 are applied to the set input of MIR 172 through G176. Set input signals are also applied to MIR 172 through G178. Set input signals are applied to ISPR 174 from I166 and I170 through G180.

ISS detected signals from I168 are applied to the set input of ISPR 174 through G182. MIR 172 is reset and ISPR 174 is set, by signals from G184. The trigger input of MIR 172 is activated by signals from G186. Reset signals are provided for ISPR 174 and MIR 172 from $RD/tp_1$.

"1" outputs of MRR 82 (Fig. 7B) and "0" outputs of MRR 82 are passed through Gs188 and Gs194 (Fig. 7C) before being combined and applied to one group of inputs of the adder 202 (Fig. 7D). Gs188 is controlled by G190 and G192. Gs194 is controlled by G196 and G198.

Certain connections are made between the components of the left and right sides shown in Fig. 7C. Set ISPR signals are derived from G132. Set ISPL signals are derived from G178. G140 outputs are applied to the reset input of ISPR 174. G184 is coupled to the set input of ISPL 122 and to the reset input of MIL 124. The output if G136 and the coupled delay line 138 is applied to the reset input of MIR 172.

The adder circuits are shown in Fig. 7D. The adder 202 has two groups of four bit inputs, each of which is responsive to a different set of signal combinations from the gating arrangtments of Fig. 7C. The adder 202 also has a carry input. Outputs from the adder 202 are applied to the binary to coded decimal converter 204. The converter 204 provides a multi-channel output and a carry output. The muti-channel output from the converter 204 is directed to a parity generator 212 and through Gs206 to an adder output register (AOR) 210. Gs206 is controlled by G208.

Adder output register (AOR) 210 staticizes the character corresponding to the output of the converter 204. The converter 204 output represents the four least significant bits of the character, so that signals for these bits are applied to the $2^0$, $2^1$, $2^2$, and $2^3$ set inputs of AOR 210. The $2^4$ and $2^5$ bit inputs of AOR 210 are provided through G248 and G249 respectively. The $2^6$ set input of AOR 210 is activated by signals provided from parity generator 212 through G214. G214 is controlled by G208. AOR 210 is reset by the output of G216.

The "1" and "0" outputs of AOR 210 are divided and combined in a predetermined fashion. The four lowest order bits ($2^0$ to $2^3$) from the "1" outputs are directed through Gs218. The four lowest order bits ($2^0$ to $2^3$) from the "0" outputs are directed through Gs220. The three highest order bits ($2^4$ to $2^6$) from the "1" outputs of AOR 210 are directed through Gs219. The outputs of Gs218 and Gs220 are combined into a four channel group. The outputs of Gs219 are coupled into this four channel group to provide a final seven channel group. The seven channels, carrying the $2^0$ to $2^6$ bits, are coupled to the inputs of HSML 50 and HSMR 52 (Fig. 7B). Gs218 (Fig. 7D) is controlled by G222 and Gs220 is controlled by G224. Either G222 or G224 opens Gs219. Both G222 and G224 are controlled by the outputs of an end-around-carry indicator (EACI) multivibrator 226.

Carry outputs from the converter 204 are directed successively through G228 and delay line 230 to the set input of a first carry multivibrator 232. "1" outputs from the first carry multivibrator 232 are applied through G234 to the set input of a second carry multivibrator 236.

The second carry multivibrator 236 may be reset by the output of G238 or the output of G240. The first carry multivibrator may be reset by the output of G240 or by the output of G241.

"1" outputs of the second carry multivibrator 236 and "0" outputs of the second carry multivibrator 236 are combined and applied to the carry input of the adder 202. The "1" outputs of the second carry multivibrator 236 are controlled by G242 and "0" outputs of the second carry multivibrator are controlled by G244.

The multi-channel output of the converter 204, which comprises four channels, is combined together with the output of the parity generator 212, and the outputs of G248 and G249 are applied to an adder comparator 246. As is explained below, these combined signals may represent a seven channel input to one side of the adder comparator 246. An eighth input is applied to the adder comparator 246 from the "0" output of the first carry multivibrator 232. The eighth input is on the same side of the adder comparator 246 as the previously described seven inputs. Another group of inputs are applied to the adder comparator 246 from the "1" and "0" outputs of AOR 210. An eighth channel signal, derived from the "1" output of the first carry multivibrator 232, is combined with the signals provided from AOR 210. The adder comparator 246 may provide an equality signal, when no discrepancy occurs. Failure to provide the alarm signal indicates a discrepancy, or that the adder comparator 246 is inoperative.

C. CONDITIONS OF OPERATION

A general function of the system is to add or subtract two operands, verify the answer by a second addition or subtraction, and put the answer in one of the memories. The operands, for example, may be binary-coded decimal operands as follows:

S*p*423S*p*S*p*S*p*

S*p*S*p*14M*i*S*p*

Although the operands are treated in decimal fashion the operation may be more precisely called algebraic, because the signs of the operands and the special symbols are utilized in the operation.

In the operation of the system information is assumed to be grouped into items of variable, non-standard maximum length. Each item is separated from other items by at least one of the special characters or symbols, such as space or item separator symbols. A space symbol is treated as the equivalent of a plus symbol for purposes of indicating the sign of an operand. A minus quantity is indicated by the special minus symbol. The sign of an operand is determined and signified by the special symbol, either space or minus, placed adjacent to the least significant character of a quantity. When the quantities are handled, least significant characters first, the sign symbol immediately precedes the least significant character and may be said to be at the right of the operand. The memory contains blank (space or S*p*) symbols wherever some other character has not been stored.

Quantities are assumed to be in excess three code. Each character is further assumed to be composed of seven binary digits including one parity bit. Addresses of characters in the memory are provided as eleven binary digit combinations. The present arrangement may be a part of the computing system described in the said Bensky application, which provides operand and address information. The address information specifies the location of the operands in the memories and indicates where the result of an operation is to be placed. The addresses of the two operands are applied to the A counter 10 and the B counter 12 of Fig. 7. The address of the result is an eleven binary digit signal combination set into the C counter 14 at the beginning of the operation. In addition, a twelfth binary digit value ($2^{11}$ digit) is applied to the C counter 14 to indicate and control whether the result is placed in the left memory or the right memory. By automatic or manual program means add and subtract signals (A and S, respectively) may be provided. The arrangement will add or subtract depending upon whether an A or an S signal is present. An additional control signal, called option bit *c*, may be supplied to indicate whether the subtrahend is in the left memory or in the right memory. Option bit *c* may have a binary "0" value (indicated as *c* (0)), indicating that the subtrahend is on the left, or a binary "1" value (indicated as *c* (1)), indicating that the subtrahend is on the right.

D. THE STATUS LEVELS

Each of the status levels provides a particular series of individual events, which are sometimes referred to herein as status level sequences. As a general introduction to the operation of the system some of the principal functions of each status level are set out below. A status level sequence may be repeated several times in succession or intermittently during the course of an entire operation (refer now to Fig. 6). Conditions occurring within a status level sequence may determine which one of several alternatives is to be employed. Within each status level there is a sequence of timing pulses and there may be other timing signals for effecting the desired operation in an orderly manner.

*$ROO_1$ to $ROO_4$ status levels.*—These status levels initiate an operation and are used as a preparatory phase for setting up the conditions of operation, addressing the counters, and resetting the components of the system where necessary.

*RS status level.*—On the first RS status level the lowest order (least significant) characters are read from the memories. Special symbols are recognized if they occur. All characters are returned to the memories. The RS status level sequences are repeated with the next characters, successively, until the least significant characters having numerical value are found. The last RS cycle occurs when the sign of each operand has been recorded and the least significant numerical characters are in position for a subsequent addition or subtraction operation.

*RIC status level.*—In the initial RIC status level a provisional sign may be assumed and written in to the memory as a part of a result. Provision may be made for subsequent complementation of either or both of the operands. The provisional sign may be altered during a later RIC status level if called for by the arithmetic result.

*RI status level.*—The least significant characters having numerical value are added or subtracted during the first RI status level. The sum or difference provided is converted to a result in coded-decimal form. A repetition of the addition or subtraction during this status level provides the necessary verification. Carries resulting from the conversion from binary to coded decimal form are stored. In later RI status levels a stored carry may be added in with the characters of both operands. The verified character to be provided as a result is placed at the proper address of the result in the chosen memory. An RI status level may mark the termination of an operation if both operands have ended.

*RO status level.*—On each RO status level characters are read from the memories and a search is made for special symbols. If special symbols are encountered they may be returned to the memory. Subsequent to an RO status level there may be another RI status level if more addition is required. There may be an end-around-carry (RD status level), or the operation may terminate if the ends of both operands have been found and no carry is present.

*RD status level.*—In the RD status level the address of the least significant character in the result is found and preparation is made for an end-around-carry sequence.

Thereafter the end-around-carry may be effected utilizing the carry digit and the stored result as the operands.

*IC status level.*—When an instruction is complete the system goes to the IC status level. As pointed out in broad terms above the instruction complete condition may result following any one of a number of status level sequence.

E. SYSTEM OPERATION

An example of an operation in which most of the features and status levels of the system are utilized is found in the following instructions:

Add:

*Sp* 4 2 3 *Sp Sp Sp*
to
*Sp Sp* 1 4 M*i Sp*
Place the result (409 *Sp*) in HSML.

For the addition an A signal is provided. The value of option bit *c* has no effect in addition. A binary "1" stored as the 2'' bit in the C counter 14 (Fig. 7A) signifies that the result is to be stored in the left memory HSML 50 (Fig. 7B).

The first phase of an operation on the above problem is the selection of operands and the preparation of the system for handling the problem. This first phase is carried out during the ROO status levels.

At $ROO_1/tp_1$ A counter 10 (Fig. 7A), B counter 12, C counter 14, E counter 16, and RMV 19 are reset. The A, B, and C counters 10, 12 and 14 respectively, are therefore placed in condition to receive address input information. This address input information, and the "0" value for the 2'' bit in the C counter 14 may be provided during $ROO_1$ or one of the latter ROO status levels. The E counter 16 starts the operation with a count of all zeroes.

On the conclusion of $ROO_1$ the $tp_8$ signal is provided. As shown in Fig. 5, the coincidence, of $ROO_1$ and $tp_8$ provides an output from $ROO_2$ gate 332 which is applied to the $ROO_2$ multivibrator 304. In the manner previously explained an $ROO_2$ status level signal is provided from the $ROO_2$ multivibrator 304. All other status level multivibrators 302, 306 to 320, are in a reset condition. In similar fashion, subsequent $ROO_3$ and then $ROO_4$ status level signals are provided in a regular progression as $tp_8$ is reached in each status level.

On the occurrence of $ROO_4/tp_1$ G184 (Fig. 7C) is fully activated and sets ISPL 122, resets MIL 124, resets MIR 172, and sets ISPR 174. The setting of ISPL 122 and ISPR 174 in effect assumes that a space is to be returned to each of the memories. At $ROO_4/tp_1$ also G216 (Fig. 7D) resets AOR 210 in preparation for later operations. At the same time and by the same pulse EACI multivibrator 226 is reset.

On the occurrence of $tp_{8s}$ in the $ROO_4$ status level an output is provided from the status gate 338 coupled to the RS multivibrator 310 in the status level generator (Fig. 5). The arrangement enters the RS status level and begins the second phase of the operation.

The second phase of the operation consists of a search for the least significant characters having numerical value (as distinguished from special symbols) from each item. At the start of the RS status level, at $tp_1$, G36 (Fig. 7A) is fully activated. Also, G36 opens G*s*32 and G*s*34. Thus A counter 10 and B counter 12 provide addresses to HSML 50 and HSMR 52 (Fig. 7B) respectively. The memories 50 and 52 receive and hold the address information as long as read-write signals are supplied from their respective read-write multivibrators 54 and 62. Note that signals from G36 and G42, which set addresses into the memories 50 and 52, also set both HSML read-write multivibrator 54 and HSMR read-write multivibrator 62. The "1" outputs of these multivibrators 54 and 62, which are the read-write signals for the memories, are thus applied to the memories 50 and 52 unless a later, reset, signal is applied to one of the read-write multivibrators 54 and 62.

On $tp_1$, therefore, HSML 50 and HSMR 52 staticize the address of the first characters. The first characters are space symbols.

At $tp_1$ also G86 and G90 (Fig. 7B) are fully activated. ISPL(1) and ISPR(1), which show the presence of space symbols, are provided at this time because ISPL 122 and ISPR 174 were set during the previous $ROO_4$ status level. MRL 80 and MRR 82 (Fig. 7B) are therefore reset, and in condition to receive new characters.

At $tp_2$ memory output clock pulse (MOC) begins. At MOC, G78 (Fig. 7B) is fully activated, and provides an output which opens G*s*74 and G*s*76. The space symbols staticized by HSML 50 and HSMR 52 are therefore applied to MRL 80 and MRR 82. MRL 80 and MRR 82 staticize the space symbols for later use in the operation.

The $tp_2$ pulse fully activates G18 (Fig. 7A), which has its other inputs primed by RS, AS, and ISPL(1) signals. The output of G18 applies a trigger input to A counter 10. Similarly, G22 is fully activated (by ISPR(1), $tp_2$, AS, and RS signals) and applies a trigger input to B counter 12. The counts staticized by the A counter 19 and the B counter 12 are thus advanced by one, so that each counter 10 and 12 represents the address of the next second character in each item.

During MOC, therefore, a first character from each of the items is staticized by HSML 50 and HSMR 52 and set into MRL 80 and MRR 82. The symbol recognition circuits test the contents of the registers to determine whether special symbols are present. In the given example, the Not Space recognition gate 164 provides low level outputs in response to the space symbols staticized by the registers. The inverter 116 coupled to the Not Space recognition gate 110 on the left side therefore provides a high level output, which is the space symbol detected signal. Similarly, the inverter 170 coupled to the Not Space recognition gate 164 on the right side provides a high level space symbol detected signal.

At $tp_5$ in the RS status level G140 is fully activated and provides an output which resets ISPL 122 and also resets ISPR 174. At $tp_6$ in the RS status level, however, G128 is fully activated and ISPL 122 is set. At the same time and in the same manner G180 provides an output which sets ISPR 174. Thus ISPL(1) and ISPR(1) are provided, indicating the detection of space symbols in both operands.

At $tp_6$ G102 and G106 (Fig. 7B) provide outputs to G*s*100 and G*s*104, respectively. Thus the space character staticized by MRL 80 is entered into HSML 50 and the space character staticized by MRR 82 is entered into HSMR 52. The space characters are therefore returned to the same addresses from which they were taken in the memories 50, 52.

In this situation, $tp_{8s}$ does not activate any gate in the status level control circuits (Fig. 5). Thus the system remains in the RS status level for another sequence of timing pulses. A second RS sequence is now carried out for the same purpose of looking for the least significant numerical characters in the items. The characters which are now addressed in the memories are the second characters, which are a space symbol in the left memory and a minus symbol in the right memory.

The A counter 10 (Fig. 7A) addresses HSML 50 (Fig. 7B) and the B counter 12 (Fig. 7A) addresses HSMR 52 (Fig. 7B). MRL80 and MRR 82 are reset to receive new information, and A counter 10 and B counter 12 (Fig. 7A) are advanced one. A space symbol is then read from HSML 50 (Fig. 7B) into MRL 80 and a minus symbol is read from the selected storage position of HSMR 52 into MRR 82.

As the two characters are held in the registers, ISPL 122 (Fig. 7C) and ISPR 174 are reset at $tp_5$. The characters staticized by the registers are at this time being applied to the recognition gates of Fig. 7C. The space symbol is detected at the Not Space recognition gate 110 on the left side and a space symbol detected signal is provided from the coupled inverter 116. The minus symbol staticized by MRR 82 (Fig. 7B) is detected by the Not Minus recognition gate 160 (Fig. 7C) and a minus symbol detected signal is provided by the inverter 166. At $tp_6$ in the RS status level G128 again provides an output, setting ISPL 122. $Tp_6$ also fully activates G176 and G180 on the right-hand side, setting MIR 172 and ISPR 174, respectively.

The space character held in MRL 80 (Fig. 7B) and the minus character held in MRR 82 are returned to HSML 50 and HSMR 52 at $tp_6$. At $tp_6$ G102 opens Gs100 and G106 opens Gs104, passing the signal combinations back to the memories from the registers in the fashion described above.

A third RS status level sequence is now undertaken, because at $tp_{8s}$ ISPL(1) and ISPR(1) signals are provided and no gates 330 to 366 in the status level control circuits (Fig. 5) are fully activated. The third RS status level is a part of the continuing second phase of the operation. As the third RS status level is begun the A counter 10 (Fig. 7A) provides the address of the third character (space) in the left memory HSML 50 (Fig. 7B) and the B counter 12 (Fig. 7A) provides the address of the third character (4) in the right memory HSMR 52 (Fig. 7B).

The RS status level sequence begins in the manner described above. The memories 50 and 52 (Fig. 7B) are addressed, the registers 80 and 82 are reset and the A and B counters 10 and 12 (Fig. 7A) are advanced by one. On MOC, the space stored in HSML 50 (Fig. 7B) is written into MRL 80 and the character 4 stored in HSMR 52 is written into MRR 82.

At $tp_5$ ISPL 122 (Fig. 7C) and ISPR 174 are reset by G140. MIR 172, which was previously set to indicate the presence of a minus symbol, remains in the set condition.

Following the action of writing in the third characters in each item into the registers 80 and 82 (Fig. 7B), the registers 80 and 82 staticize the characters for the recognition circuits. The Space symbol staticized by MRL 80 is detected by Not Space Recognition gate 110 (Fig. 7C) and a space symbol detected signal is provided by inverter 116. At $tp_6$ ISPL 122 is set. On the right side, however, the character (4) staticized by MRR 82 obviates special symbol recognition. MIR 172 and ISPR 174 thereof remain in the condition of MIR 172 set and ISPR 174 reset.

At $tp_6$ also the space in MRL 80 (Fig. 7B) is returned through Gs100 to HSML 50 and the character 4 in MRR 82 is returned through Gs104 to HSMR 52. As above, the characters are returned to the same positions at which they were stored when read out from the memories.

An ISPL(1) signal is provided during the occurrence of $tp_{8s}$. The presence of the ISPL(1) signal produces another situation in which none of the status gates of Fig. 5 are activated. Therefore the system repeats the RS status level for the fourth time.

To summarize the second phase of the operation to this point, the first three successive characters of each operand, starting with the least significant character, have been inspected and returned to their storage positions in the memories. The occurrence of a minus sign on the right side has been stored in MIR 172 (Fig. 7C) and a character 4 (the least significant numerical character of the operand in the right hand side) has been stored in MRR 82 (Fig. 7B). No addition has been made and the least significant numerical character (3) in the operand on the left side has not yet been found. The RS status level is repeated to pair together the least significant numerical characters of the two operands.

The fourth RS status level begins as did the previous RS status levels by addressing the memories HSML 50 and HSMR 52 (Fig. 7B) from their respective counters, A counter 10 and B counter 12 (Fig. 7A). G36 opens both Gs32 and Gs34 to provide this addressing function. MRL 80 (Fig. 7B) is reset at $tp_1$ because G86 is fully activated (by ISPL(1), RS, AS, and $tp_1$). MRR 82, however, is not reset because at this time G90 lacks an ISPR(1) input signal.

Only HSML 50 provides a character signal combination in this RS status level. A read-write signal is provided to HSML 50 from HSML read-write multivibrator 54 following $tp_1$ and the HSML read-write multivibrator 54 is not reset during the fourth RS cycle. The read-write signal applied to HSMR 52 is cut off at $tp_2$, however, because G66 is fully activated (by $tp_2$, AS, RS, and ISPR (0)) and resets HSMR read-write multivibrator 62. On MOC, therefore, G78 opens both Gs74 and Gs76, but signals are passed only from HSML 50 through Gs74 to MRL 80. The addressed character (3) in HSML 50 is therefore written into MRL 80.

$Tp_2$ is applied to a fully primed G18 (Fig. 7A), and G18 provides an output which advances A counter 10 by one count. G22, however, is not fully primed (an ISPR(1) is lacking) so that B counter 12 is not advanced one and holds the same address.

At this point in time MRL 80 (Fig. 7B) staticizes the character 3 and MRR 82 retains the staticized character 4. The recognition gates therefore do not detect any special symbol, G140 (Fig. 7C) resets ISPL 122 and ISPR 174 (Fig. 7D) at $tp_5$. But because no special symbol is present neither ISPL 122 or ISPR 174 is set at $tp_6$.

The character 3 stored in MRL 80 (Fig. 7B) is returned at $tp_6$ to HSML 50 in the manner described above. The character 4 which is stored in MRR 82 was returned earlier to HSMR 52.

At this stage of the operation, therefore, the least significant numerical character in each of the items has been found. The counters present the next addresses to be employed at the memories. The presence of a minus symbol in the operand on the right side is indicated by "1" output from MIR 172. Completion of the task of searching through symbols is indicated by "0" outputs from both ISPL 122 (Fig. 7C) and ISPR 174.

The second phase of the operation is terminated by entering the RIC status level. At $tp_{8s}$ in the fourth RS status level the first RIC status level gate 340 (Fig. 5) is fully activated. AS, RS, ISPL(0), ISPR(0), not ISSR, and not ISSL signals are provided to the first RIC gate 340 at this time, thus fully activating the first RIC gate 340. The not ISSR and not ISSL signals are provided until item separator symbols are detected in the items stored in the right or the left memory, respectively. A not ISSL signal may be provided, for example, by one of the outputs of a bistable multivibrator responsive to the not ISS recognition gate 112 (Fig. 7C) and the coupled inverter 118, or directly from the inverter 118. The output of the first RIC gate 340 (Fig. 5) is applied to the RIC multivibrator 312 and an RIC status level signal results in the manner described above.

The beginning of the RIC status level initiates a third phase of the operation. In the third phase, there may be a provisional write-in to the memory of a sign for the result.

At $tp_1$ in the RIC status level the C counter 14 (Fig. 7A) is used to address the memories. G42 is fully activated and opens Gs38 and Gs40. The address set up by C counter 14 is the address of the least significant character in the result. Here the least significant character in the result is to be the sign, either plus (space) or minus. The C counter 14 address is provided to and held by HSML 50 and HSMR 52 (Fig. 7B). The address is, however, held and used only in HSML 50, because the memory read-write signal is removed from HSMR 52 at $tp_2$. At $tp_2$ the inputs of G68 are all activated (by $tp_2$, RIC, and CCTR $2^{11}$(0) signals) and G68 provides an output which resets the HSMR read-write multivibrator 62. Thus only HSML 50, which has been selected by the $2^{11}$ digit of the C counter 14 to hold the result, is addressed to the location at which a least significant character of the result is to be placed.

The C counter 14 (Fig. 7A) is advanced one count at $tp_2$ by fully activated G20 and staticizes the next address location for the result. E counter 16, which counts the number of characters in the result, is now employed. As is described below E counter 16 ends each complete addition or subtraction operation filled with binary zeroes, so that each operation is begun with the same combination staticized by E counter 16. At this point in time E counter 16 is in an add phase because of the "0" output provided by RMV 19. The count on E counter 16 is advanced at $tp_2$ by an output from G30. E counter 16 thus begins an additive count (the first signal providing a combination of 000001, the next providing 000010, etc.)

HSML 50 (Fig. 7B) is addressed at the first character of the result, and a minus in the right side operand is indicated by a MIR(1) output. The MIC signal, which begins with $tp_5$, therefore finds the minus write gate MWG 72 fully primed, so that MWG 72 provides an output. MWG 72 forms the minus signal combination, which is written into HSML 50. The minus symbol thus written into HSML 50 is in this situation a provisional sign for the result and is placed in the position preceding the least significant numerical character of the result. This provisional minus sign for the result may be changed if the results of the addition show that in fact the result is a positive quantity. In the example given the result will be positive and the minus sign will be changed; for the present, however, a minus result is assumed.

The existence of a minus quantity is held in and indicated by MIR 172. G136 is coupled to the reset input of MIR 172, but is not activated because an MIL(0) signal is provided. Neither Gs100 nor Gs104 are opened due to the absence of both the RO and RS status levels. Accordingly the least significant characters of the operands to be added remain in MRL 80 and MRR 82 respectively. Nor is the address of the A and B counters advanced, for a similar reason; absence of both RO and RS.

The RIC status level is terminated and the RI status level is commenced at $tp_{8s}$. At $tp_{8s}$ the first RI status gate 356 (Fig. 5) is fully activated (by RIC, AS, EACI(0), and $tp_{8s}$ signals) and provides an output which sets the RI multivibrator 314 and provides an RI status level signal in the manner described above.

The fourth phase of the operation is begun with the RI status level. The fourth phase includes addition of successive pairs of characters, verification of each sum character, and placement of the sum characters in the memory. To recapitulate the previous processes, at the start of the RIC status level the least significant numerical characters of the two operands are held in MRL 80 and MRR 82 (Fig. 7B). These characters have also been returned to the locations in the memories from which they were read. A minus symbol has been written in as the first character of the sum in the chosen memory, HSML 50.

At $tp_1$ in the RI status level G42 (Fig. 7A) is fully activated and opens Gs38 and Gs40. The address staticized by C counter 14, which is the address of the first character following the minus sign in the result, is placed during $tp_1$ in HSML 50 and HSMR 52 (Fig. 7B). The address thus provided is held only by HSML 50 because at $tp_2$ the read-write signal is removed from HSMR 52. The HSMR read-write multivibrator 62 is reset at $tp_2$ by fully activated G68.

During $tp_1$ also the first carry multivibrator 232 (Fig. 7D) receives a reset signal. $Tp_1$ fully activates G241, which applies a reset signal to the first carry multivibrator 232. Because the first carry multivibrator 232 was previously reset during $ROO_4$ the reset signal has no effect during this RI cycle.

As shown in Fig. 4, $tp_1$ marks the beginning of the $RI_a$ signal supplied during each RI status level. The $RI_a$ signal is provided until after $tp_3$ and is applied to G144, G150, G190, and G196 (Fig. 7C). The last mentioned gates are in the circuits which couple MRL 80 and MRR 82 (Fig. 7B) to the adder 202 (Fig. 7D). Only G144 (Fig. 7C) and G196 are fully activated, however, because at this point in time MIL(0) and MIR(1) signals are provided. G144 opens Gs142 which is coupled to the "1" outputs of MRL 80 (Fig. 7B). G196 (Fig. 7C) opens Gs194, which is coupled to the "0" outputs of MRR 82 (Fig. 7B). Thus, the least significant character (3) from the item on the left side is applied uncomplemented from MRL 80 (Fig. 7B) through Gs142 (Fig. 7C) to one group of inputs of the adder 202 (Fig. 7D). The least significant character of the item in the right memory is a 4. The number applied from MRR 82 (Fig. 7B) to the adder 202 (Fig. 7D), however, is the nines complement of 4. As explained above, in the excess three code the nines complement of a character is provided at the "0" outputs of a register. Thus a character 5 is applied to the remaining group of inputs of the adder 202 (Fig. 7D).

During $RI_a$, the adder 202 is provided with two character signal combinations, one complemented and the other not complemented. A "0" value for the carry is also provided during $RI_a$, G242 (Fig. 7D) being activated by $RI_a$. A "0" output is provided from the second carry multivibrator 236, however, because of the previous reset signals from G240 which occurred during the $ROO_4$ status level, AS and $tp$, being high.

The adder 202 uses only the four least significant bits, which determine the numerical value, of each character. Referring to Fig. 4, one may see that the first adder output pulse ($AOP_1$) is enveloped by $RI_a$ and in turn envelops the first converter output pulse ($COP_1$). The time duration of $COP_1$ in turn envelops $tp_2$. This time relationship insures that the adder 202 (Fig. 7D) is on only during the period that input signals are provided to it, that the converter 204 is activated only while the adder 202 is activated, and that the output of the converter 204 is used only during the time the converter 204 is activated. The time relationships further prevent transient effects occurring at the beginning and end of pulses from affecting the result of an operation.

The output of the adder 202 is the excess three code equivalent of decimal eight. The five bit adder 202 output is provided during $AOP_1$ to the converter 204 which, during $COP_1$, provides a four bit output. The converter 204 may also provide a carry signal, on the separate carry output, but no carry signal results here from the conversion of the result character eight.

The four bit output of the converter 204 represents the four least significant binary digits of the result character. The next two most significant digits are added to the output of the converter 204 from G249 and G248. It will be recalled that numbers in the code chosen here as an example are of the form 01 XXXX (where X is a bit value). Because a signal represents a binary "1," and because the $2^4$ bit is one and the $2^5$ bit is zero in the chosen code, the proper six bit character (without a parity bit) is recreated by the addition of the outputs of G248 and G249. The $2^5$ bit channel exists but a signal need not be provided in it from G248 at this time.

The augmented converter 204 output is applied to AOR 210 through Gs206. Gs206 are opened under control of G208 during $tp_2$. The converter 204 output, as augmented, sets the binary configuration of the result character into the $2^0$ and $2^5$ bit places of AOR 210.

The $2^6$ bit place of AOR 210 holds the parity bit for the result character. The parity bit is generated by a parity generator 212 from a six bit input comprised of the converter 204 output, the $2^4$ bit output from G248, an $RI_a$ signal being present and the "0" value in the $2^5$ bit channel from G248. This latter G248 is not actuated until $RI_b$ as is described below. Parity generator 212 provides an output or no output, depending upon the sum of the binary "1's" is the character and the parity scheme desired. The parity generator 212 output is provided through G214 (opened by G203 at $tp_2$) to the $2^6$ bit place of AOR 210 at the same time as the other six bits of the character are provided from G*s*206.

Thus AOR 210 now holds the character which is the result of the addition of the first characters of the two operands. No carry signal has been provided, so that the first carry multivibrator 232 is not set when G223 is tested at $tp_2$ for the existence of a carry signal.

Each addition step within the addition phase includes a verification procedure in addition to the error check involved in the generation of a parity bit. In generating the parity bit some incorrect signal combinations may be detected as described in the above-identified Sublette and Spielberg application. For a more complete check, however, the addition process is again carried out in a different manner during the second part of the RI status level and the results of the two additions are compared, without any loss in system time.

$T_{p5}$ marks the beginning of MIC (refer to Fig. 4) in what may be called the second half of the RI status level. During MIC, G224 (activated by RI, A, MIR(1), EACI(0), and MIC signals) opens G*s*220 and G*s*219. G*s*220 couples the $2^0$ to $2^3$ "0" outputs of AOR 210 to the inputs of HSML 50 and HSMR 52 (Fig. 7B). G*s*219 (Fig. 7D) couples the $2^4$ to $2^6$ "1" outputs of AOR 210 to the inputs of HSML 50 and HSMR 52 (Fig. 7B). The $2^0$ to $2^3$ bits, which comprise the numerical portion of the character in the illustrated code, are therefore complemented. The $2^4$ to $2^6$ bits, representing parity and specially significant bits, are not complemented. The correct code complement (1) of the stored character (8) is therefore provided to HSML 50 (Fig. 7B). Parity remains correct because complementing the $2^0$ to $2^3$ bits being even in number does not change the total number of "1" bits. HSMR 52 is inactivated at this time because of the absence of the read-write signal. Because of the address provided to HSML 50, the first numerical character of the result is stored in the result adjacent the previously inserted minus sign. The numerical complement is used for each result character because, as stated above, at this point in time the result is assumed to be negative.

With the start of the MIC signal, the verification procedure is begun. The verification uses the contents of AOR 210 and the results derived from a new addition and complementation of the characters stored in MRL 80 and MRR 82. A timed relationship of signals is once more used to control the passage of information in orderly fashion, similar to the timed relationship described above. Referring now to Figure 4, note that with successively shorter durations for the different time pulses, MIC envelopes $RI_b$, $RI_a$ encompasses $AOP_2$, and $AOP_2$ encompasses $COP_2$.

During all of MIC G152 (Fig. 7C) is fully activated and opens G*s*148. During the same period, G192 opens G*s*188. The complement (6) of the character (3) stored in MRL (Fig. 7B) is therefore provided from the "0" outputs of MRL 80 to one set of inputs of the adder 202 (Fig. 7D). The character (4) held in MRR 82 (Fig. 7B) is directed without complementation to the other set of inputs of the adder 202 (Fig. 7D). The "1" value (high level signal) for the carry digit is applied from the "0" output of the second carry multivibrator 236 through G244 to the adder 202. Thus the complements of the bits of the two sets of inputs and of the carry value are applied to the adder.

The adder 202 is activated during $AOP_2$ and provides a five bit output which is the excess three code equivalent of the decimal sum (11) of the three input values (6, 4, and 1) The adder 202 output, applied to the converter 204, results in an output from the converter 204 during $COP_2$. The output is the binary-coded decimal in excess three code equivalent (one and a carry) of the binary output of the adder 202. The converter 204 output is directed to one side of the adder comparator 246. Note that the converter 204 output is the nines complement of the previous converter 204 output (8). $2^4$ and $2^5$ bit values are provided during $RI_b$ from G249 and G248 these values being the complements (0 and 1, respectively) of the $2^4$ and $2^5$ bit values previously inserted during $RI_a$. No signal is provided by G249 for the $2^4$ bit in the absence of an $RI_a$ signal, nor is one needed. The $2^5$ bit value is provided from G248 to the adder comparator 246.

The parity generator 212, which at this time is responsive to the output of the converter 204 and the output of G248 and G249, provides a signal value which is the complement of the previous parity bit value. The "0" output from the first carry multivibrator 232 is coupled to the same side of the adder comparator 246 as the complemented result character. The "1" output of the first carry multivibrator 232 is coupled to the other side of the adder comparator 246 along with each of the outputs from AOR 210. The function of the adder comparator 246 is to compare the complemented character and complemented carry on one side with the uncomplemented output of AOR 210 and the uncomplemented carry on the other side. The use of this arrangement of inputs with the comparator described in the application of Cheilik referred to above may permit elimination of some of the components used in the Cheilik arrangement. The fourteen outputs of AOR 210 may be used instead of the pulse transformers shown therein to generate, for example, "*a*" and "not *a*" signals on one side. Note that the signal pattern provided by complementing should, if again complemented by proper coupling at the comparator 246, match the signal pattern provided during the original addition. If the complemented values obtained during $RI_b$ do not have the proper relationship to the values stored in AOR 210 during $RI_a$, the adder comparator 246 will fail to provide an equality signal. The presence of an equality signal, however, gives a positive check on the correctness of the addition. The adder comparator 246 is activated by $tp_7$, which occurs only within $COP_2$.

Thus errors occurring in the addition, conversion, or translation of information during an RI cycle may be detected within the same RI cycle by a simple new manipulation of the information involved.

At $tp_{8s}$ the first RI status level is concluded and an RO status level is entered. The first RO status gate 358 (Fig. 5) is fully activated (by RI, A, EOBO(0), and $tp_{8s}$ signals), and provides an output which sets the RO multivibrator 316 to provide the RO status level signal.

The fourth phase of the operation includese the RO sequence, in which the next characters to be used are selected from the memories and provided for the addition. On beginning the RO sequence the A counter 10 (Fig. 7A) staticizes the address of the 2 from the operand (423) stored in HSML 50 (Fig. 7B). The B counter 12 (Fig. 7A) staticizes the address of the 1 from the operand (14) in HSMR 52 (Fig. 7B). The C counter 14 (Fig. 7A) holds but does not provide the address of the next to least significant numerical character of the result until the succeeding RI phase.

$Tp_1$ of the RO status level sequence is employed to reset a number of components of the system. At $tp_1$, G84 is fully activated and resets MRL 80; likewise, G88 resets MRR 82. G216 (Fig. 7D) provides an output to reset AOR 210, erasing the previous result stored in AOR 210. The second carry multivibrator 236 receives a reset impulse from G238, but is not affected at this time because already reset.

At $tp_1$ also, G36 (Fig. 7A) opens Gs32 and Gs34, and sets the read-write multivibrators 54 and 62. A counter 10 and B counter 12 thus provide addresses for HSML 50 and HSMR 52 (Fig. 7B), respectively.

$Tp_2$ starts the MOC signal (refer to Fig. 4). $Tp_2$ itself activates G18, advancing A counter 10 (Fig. 7A) by one count. B counter 12 is advanced one count at $tp_2$ by G22. The carry signal stored in the first carry multivibrator 232 (Fig. 7D) is used at $tp_2$ to set the second carry multivibrator 236 through G234.

The MOC pulse activates G78 (Fig. 7B), opening Gs74 and Gs76 and placing the address character from HSML 50 into MRL 80, and the address character from HSMR 52 into MRR 82.

The addresses provided to the memories are held by the memory throughout the RO sequence. When, therefore, G102 opens Gs100, and G106 opens Gs104 at $tp_6$, the characters in the registers 80 and 82 are returned to the locations in the memories 50 and 52 from which the characters were read. Note that at $tp_6$, G126, G128, G180, and G182 in Fig. 7C are tested to determine if space or item separator symbols have been detected. In the given example these special symbols are not present at this time.

At $tp_{8s}$ the RO status level, the second RI gate 354 (Fig. 5) is fully activated (by A, EOBO(0), RO, and $tp_{8s}$ signals). Therefore at $tp_{8s}$ the second RI gate 354 sets the RI multivibrator 314 to provide the RI status level signal.

The operation is now continued with the two characters (2 and 1) stored in the registers. The process is similar to the RI sequence described above and will not be repeated in the same detail. In the first part of the RI sequence HSML 50 (Fig. 7B) is addressed with the location at which the result character is to be placed, and the C counter 14 (Fig. 7A) and the E counter 16 are advanced one count. The selected character (2) from the left side is read without complementation into the adder 202 (Fig. 7D). At the same time, the character (1) held in the right register is provided after complementation (to an 8) the adder 202. The carry signal from the second carry multivibrator is also provided, uncomplemented, to the adder 202.

The adder 202 provides the sum (10) of the three separate inputs to the converter 204. The converter 204 in turn provides a carry signal to set the first carry multivibrator 232 and a four bit zero output for AOR 210. The four bit output of the converter 204 is augmented by the $2^4$ and $2^5$ bit values, and by the $2^6$ (parity) bit value when placed in AOR 210.

In the second part of the RI sequence the character (0) held by AOR 210 is delivered, after complementation to a nine in the chosen code, to the selected location in the left memory.

The verification of the character held in AOR 210 with the result of a second addition using complementary values is repeated in the manner described above. The complementary values of the characters and of the carry signals are provided to the adder 202, and through the adder 202, to the converter 204. The complementation pattern is employed in the augmenting bits as well as in the output of the converter 204. The full seven bit complemented character, plus the complemented carry, is used to verify the AOR 210 output, with uncomplemented carry. The existence of the proper relationship is determined and signalled by the adder comparator 246.

The second RI status level ends as did the first, at $tp_{8s}$, with a transition to an RO status level. At $tp_{8s}$, the first RO status gate 358 (Fig. 5) is fully activated and sets the RO multivibrator 316 to provide the RO status level signal.

The second RO sequence now undertaken prepares for the addition of a 4 (from 0423 in the left side) to a space symbol (from Sp 14 in the right side). Together with preparation for addition, the second RO sequence includes recognition of the end of the shorter item.

At $tp_1$ MRL 80 (Fig. 7B) is reset from G84; MRR 82 is reset from G88, and AOR 210 (Fig. 7D) is reset from G216.

Gs74 and Gs76 (Fig. 7B) are opened by G78 on the MOC signal, applying the 4 from HSML 50 to MRL 80 and the space from HSMR 52 to MRR 82. The memories were addressed at $tp_1$ by the coupled A and B counters 10 and 12 (Fig. 7A), and the A and B counters 10 and 12 are advanced at $tp_2$ by G18 and G22, respectively. The carry stored in the first carry multivibrator 232 (Fig. 7D) sets the second carry multivibrator 236 through G234 at $tp_2$.

Following MOC, the characters held in the memory registers 80 and 82 (Fig. 7B) are returned to the memories 50 and 52, respectively at the locations from which they were read. As described above, Gs100 and Gs104 are opened at $tp_6$ to accomplish this return or regeneration of characters. The existence of a space symbol in the register MRR 82 (Fig. 7B) is detected by the Not Space recognition gate 164 (Fig. 7C) and coupled inverter 170. The Space symbol detected signal provided from I170 sets ISPR 174 through G180 at $tp_6$. ISPR 174 therefore indicates the presence of a space symbol on the right side.

For purposes of addition, the space symbol has no numerical value. Accordingly, at $tp_8$ a 3 (0 in the excess three code) is written into MRR 82 (Fig. 7B) from G96 through delay 98. The zero numerical value thus stored in MRR 82 may be said to be written over the previously stored space character. Note again that a 3 in pure binary code is a zero in the excess three code and may be added to provide the correct result.

At $tp_{8s}$, which closes the second RO sequence, the second RI gate 354 (Fig. 5) is again fully activated and sets the RI multivibrator 314 to provide an RI status level signal.

A third RI sequence is now undertaken to add the values stored in the registers and to verify the process of addition. As in the operations described above, the first part of the RI sequence includes the addition of the characters and the retention of a sum character in AOR 210 (Fig. 7D). The characters supplied to the adder 202 are a 4 (uncomplemented), a 9 (a complemented zero), and a carry (1). The sum provided by addition and conversion is 4 plus a carry. The four bit output of the converter 204 is augmented and placed in AOR 210 as a full seven bit character. During the first part of the RI sequence C counter 14 (Fig. 7A) and E counter 16 are also advanced one count.

In the second part of the third RI Sequence the 4 stored in AOR 210 (Fig. 7D) is complemented to a 5 and placed in HSML 50 (Fig. 7B) adjacent the previous result character. The addition is verified by the complementation procedure described above and if error has not occurred the equality signal is provided from adder comparator 246. Note again, no additional time is required to perform the verification.

HSML 50 (Fig. 7B), at this point in time holds the following result:

591M*i*

The desired result is +409, obtained by adding +423 and −14. Note that if an end-around-carry is added to the above provisional result (−591) and if the nines complement of each of the characters in the result is taken, the correct result ($\mu$409) is obtained. The operation continues until this correct result is provided.

At $tp_{8s}$ in the RI cycle, the RI status level is terminated and another RO status level is entered, because the first RO status gate 358 (Fig. 5) is fully activated. The RO status level now undertaken determines that numerical characters in both operands have been exhausted.

The RO status level sequence, previously described, is repeated. In this instance, however, the addressed character in HSML 50 (Fig. 7B) is an item separator symbol, which is read from HSML 50 into MRL 80 and regenerated in HSML 50 while being held in MRL 80. An ISPR(1) signal previously provided by I170 during the RO level on the detection of a space in the right-hand operand, activates G64 to reset the HSMR read-write multivibrator 62, removing the read-write signal from HSMR 52.

At $tp_6$ in the RO status level, G126 (Fig. 7C) is fully activated by the ISS detected signal provided from I118, and by RO and $tp_6$ signals, and sets ISPL 122. At $tp_7$ in the RO status level, the EOBO multivibrator (Fig. 5) is set by the coupled gate. The gate is fully activated because ISPL(1), ISPR(1), RO, and $tp_7$ signals are provided. At the conclusion of the RO cycle, AOR 210 (Fig. 7D) and the second carry multivibrator 236 have been reset, preparatory to an end-around-carry sequence.

Thus at $tp_{8s}$ the system is prepared to start an end-around-carry. To accomplish an end-around-carry the address of the C counter must be returned to the first character of the result. The RD status gate 362 (Fig. 5) activates the RD multivibrator 318, providing the RD status level signal. The signals necessary to fully activate the RD status gate 362 show that the end of both operands have been detected, that a carry signal is held, and that an MIL(1) or MIR(1) signal is present. The output of the RD status gate 362 also sets the reset multivibrator (RMV) 19 (Fig. 7A). RMV 19 activates, by its "1" output, the subtract sides of A counter 10, C counter 14, and E counter 16. During subsequent operations, A counter 10 may be returned to a lower count, but A counter 10 is not further employed in the addition.

The RD status level marks the start of the fifth phase of the operation—the revision of the provisional result stored in the memory. The RD status level is employed to return the C counter 14 to the address of the first character of the result. The RD status level is repeated a sufficient number of times to reach the desired count.

At $tp_1$ the end-around-carry indicator multivibrator (EACI) 226 (Fig. 7D) is set. Further steps now proceed in dependence upon this new condition of EACI 226. At $tp_1$ also, ISPL 122, MIL 124, MIR 172, and ISPR 174 (Fig. 7C) are reset. The EOBO multivibrator 352 (Fig. 5) is also reset at this time. These multivibrators are therefore placed in a preparatory condition for starting the fifth phase of the operation.

During the RD status level, $tp_1$ and $tp_5$ signals are applied through G26 and the coupled delay line 28 to the trigger input of the E counter 16 (Fig. 7A). Because the E counter 16 is now in the subtractive state, the count stored in the E counter 16 is reduced by two during each RD status level. Recall now that the E counter 16 started from a count of 000000, and increased through 000001 by one count with each trigger input applied to C counter 14. As the E counter 16 counts down, therefore, the $2^5$ bit value will be zero until the all "1's" state is reached. A change in the $2^5$ bit of E counter 16 from "0" to "1" therefore signifies that the C counter 14 is again at the original address. For each two inputs applied to the E counter 16, two inputs later in time (at $tp_4$ and $tp_8$) are also applied to the C counter 14 through G24. The C counter 14 therefore decreases in count along with the E counter 16. When the $2^5$ bit value from the E counter 16 is "1," the C counter 14 is again at its original count and G24 is disabled. By this procedure the value of the E counter is checked by the $2^5$ bit after each $tp_1$ and $tp_5$. No further inputs are applied to C counter 14 during the RD status level. The employment of a six bit E counter 16 assumes that no more than thirty-two characters have been counted for an item by C counter 14. If a possibility exists that an item may include more than thirty-two characters, the E counter 16 need only have a greater counting capacity.

While the E counter 16 and C counter 14 are counting down, and as long as the $2^5$ bit value from the E counter 16 is "0," the system stays in the RD status level. No status gates in Fig. 5 are activated at the termination of an RD cycle until a $2^5$(1) signal is provided from the E counter 16. When the original count is again obtained, however, the second RIC status gate 342 (Fig. 5) is fully activated, and provides an output which sets the RIC multivibrator 312 and provides the RIC status level signal. The second RIC status gate 342 output also resets RMV 19 (Fig. 7A). RMV(0) signals then place the C counter 14 again in the additive state.

Subsequent in time to the conclusion of the RD status level (at $tp_{8s}$), and prior to the commencement of the RIC status level, the C counter 14 (Fig. 7A) staticizes the address of the first character of the result in HSML 50 (Fig. 7B). During the forthcoming RIC sequence the minus (M*i*) symbol stored as the first character of the result is changed to a space (*sp*) symbol, which is the equivalent of a positive sign.

At $tp_1$ in the RIC status level, the address provided by the C counter 14 is applied through G*s*38 and G*s*40 to HSML 50 and HSMR 52 (Fig. 7B), respectively. G*s*38 and G*s*40 (Fig. 7A) are opened by G42. Only HSML 50 holds the address, however, because the memory read-write signal provided by the read-write multivibrator 62 to HSMR 52 is cut off at $tp_2$. G68 accomplishes this cut-off by resetting HSMR read-write multivibrator 62 at $tp_2$. At $tp_2$ also, the C counter 14 is advanced by one from G20 to the address of the next character of the result stored in the memory.

The address held in HSML 50 (Fig. 7B) is that of the sign (M*i*) of the result. The sign is not read out, but a space symbol written over the minus from the space write gate (SWG) 70 during the MIC signal. The space write gate 70 is fully activated during the MIC signal, because MIL 124 (Fig. 7C) and MIR 172 were previously reset at $RD/tp_1$ and provide "0" outputs during MIC. Thus the sign of the result is effectively changed to the desired positive (S*p*) sign.

At $tp_8$ MIL 124 (Fig. 7C) and ISPR 174 are set by the output of G132. The two multivibrators, as is shown below, are thereby prepared for the subsequent end-around-carry. At $tp_{8s}$ in the RIC status level the second RO status gate 360 (Fig. 5) provides an output to start an RO status level sequence.

Following the RD and RIC cycles, the EACI multivibrator 226 (Fig. 7D) controls further entry of information into the memories. During RO cycles, G36 (Fig. 7A) is disabled because EACI(0) signals are lacking. G42, however, is fully primed by the output of G43 and AS signals, and provides an output in response to $tp_1$. G42 opens G*s*38 and G*s*40 at $tp_1$ in the RO cycle, therefore, so that C counter 14 provides the address of the operand which is to be added.

After the desired character has been addressed in the memory, an RO cycle is carried out in the manner described above. Only HSML 50 (Fig. 7B) is employed in the end-around-carry, so that the read-write signal is removed from HSMR 52 following the delivery of the address. The C counter 14 (Fig. 7A) is not advanced during the RO cycle, but holds the same address for selection of the same location during entry of the final result into the memory.

In this first RO cycle following the RD and RIC cycles, the address location in HSML 50 (Fig. 7B) is that of the first numerical character (1) in the provisional result. The value thus selected from the memory is placed in MRL 80. Because ISPR 174 (Fig. 7C) was previously set during the RIC cycle, a numerical value of zero is written into MRR 82 by G96 through delay 98 (Fig. 7B). The character (1) stored in MRL 80 is returned to HSML 50 during the RO cycle, but is subject to later revision.

At $tp_{8s}$ the second RI status gate (Fig. 5) sets the RI multivibrator, commencing an RI status level.

As described above, the RI status level provides the steps of addition, verification of the result character, and placement of the result character in the memory. In the first part of the RI cycle, the unchanged C counter 14 (Fig. 7A) address is applied to HSML 50 (Fig. 7B). Thus HSML 50 is addressed to return the first result character to the same point from which it was taken for final revision. After the memory is addressed, the C counter 14 (Fig. 7A) is advanced one count to the next address location.

MRL 80 (Fig. 7B) holds a decimal 1 value, MRR 82 holds a decimal 0 value, and the second carry multivibrator 236 (Fig. 7D) holds a decimal 1 value for the subsequent addition. The carry value and the 0 value are applied without complementation to the adder 202. The 1 from MRL 80 (Fig. 7B) is complemented, however, before being applied to the added 202 (Fig. 7D). During $RI_a$ in the RI cycle, G150 is fully activated because an MIL (1) signal is provided. G150 opens G*s*148, placing the nines complement of 1, or 8, into the added 202 (Fig. 7D).

Adder 202 therefore, on summing the 8, the 0, and the carry 1, provides an output of decimal 9. The converter 204 likewise provides an output equivalent to decimal 9 to AOR 210.

In the second part of the RI cycle the complemented values are applied to the adder 202 and converter 204 and compared with the character held by AOR 210 in the adder comparator 246 in the manner described above. The character held in AOR is also provided, without complementation, to the address of the first character of the result in HSML 50 (Fig. 7B). The character in AOR 210 (Fig. 7D) is uncomplemented because EACI 226 is at this time providing a "1" output, so that G222 opens G*s*218 and G*s*219.

The return of a decimal 9 to the result completes the revision of the first character of the result. The prior determination that the provisional minus placed in the result should have been a space means that the remaining characters should also be complemented, and that a carry, if it exists, should be added.

The RI cycle is completed and another RO cycle is begun at $tp_{8s}$. At $tp_{8s}$ the first RO status gate 358 (Fig. 5) is fully activated and sets the RO multivibrator 316 to provide the RO status level signal.

In the second RO sequence following the RD and RIC sequences, a decimal 9 is taken from HSML 50 (Fig. 7B) and placed in MRL 80. MRR 82 retains the decimal 0 value previously entered. The carry signal previously held by the second carry multivibrator 237 (Fig. 7D) is removed when the second carry multivibrator 236 is reset by G238 at $tp_1$. Accordingly, the quantities provided for addition by MRL 80 (Fig. 7B) and MRR 82 are a decimal 9 and a decimal 0. There is no carry. At the completion of the RO status level ($tp_{8s}$) the system enters another RI status level. Note that the RO and RI status level sequences following the first RO and RI sequences after the end-around-carry are of the same general nature as the first RO and RI sequences. Detailed explanations are therefore omitted.

In the second RI status level following end-around-carry, adder 202 (Fig. 7D) is provided with a complemented 9, or 0, from the left side and a 0 from the right side. The resultant 0 sum is placed in AOR 210, verified and written in as the second numerical character of the result At the time of the writing in to HSML 50 (Fig. 7B) the memory holds the following item:

509*Sp*

Only the most significant character in the above result now need be changed. The change is effected by a third RO sequence and a third RI sequence. These two sequences are entered in order, the condition of the status gates of Fig. 5 being repeated in the same order as in the first RO and RI sequences.

In the third RO sequence following the RD and RIC status levels the five stored in HSML 50 (Fig. 7B) in complemented (to a 4) and added to the 0 value provided by the right side. The addition takes place during the RI status level, during which sequence also the 4 is placed in the memory. Thus the correct numerical result of 409*Sp* is obtained.

A final RO status level is entered at $tp_{8s}$ of the third RI status level. The memory holds a blank (*Sp*) adjacent to the last character of the result. The *Sp* symbol is placed in MRL 80 (Fig. 7B) and also returned to the point from which it was taken. The *Sp* staticized by MRL 80 is recognized at the Not *Sp* recognition gate 110 (Fig. 7C) and an *Sp* detected signal is provided by the coupled inverter 116. At $tp_6$ G128 provides an output which sets ISPL 122.

The system is now ready to signal that the operation has been completed. In the status level gates in Fig. 5 the EOBO multivibrator 350 is set by the output of the coupled gate G350, which is fully activated by ISPR(1), RO, and $tp_7$ signals. ISPR(1) it will be recalled was set by G132 during the RIC cycle. At $tp_{8s}$ the first IC gate 364 is in turn fully activated by AS, first carry (0), EOBO(1), and $tp_{8s}$ signals. The first IC gate 364 output sets the IC multivibrator 320 and provides the IC signal.

Thus the correct and desired result has been determined and placed at the selected locations in the desired memory. The above example has been given as an illustration of a situation utilizing the greatest number of the features of the system. Understanding this example, one may note that most other possible relationships between two operands will result in simpler or shorter operations. As is explained below, no matter what the operands given, the arrangement will provide the correct verified result. Note that the verification takes place every time the adder 202 is utilized.

F. OTHER OPERATIONS OF THE SYSTEM

A simple example of how the verification system works occurs in the addition of two positive operands. With such operands complements are not used except in the verification of the addition. The minus multivibrators, MIL 124 (Fig. 7C) and MIR 172 are not set, and the uncomplemented characters are therefore provided to the adder 202 (Fig. 7D). Signals which would set the minus multivibrator are not provided because the Not Minus recognition gates 114 and 160 (Fig. 7C) are not activated; there is no EACI(1) signal for G132 and G178, and there is no subtraction signal for G134 and G186.

The arrangement of the system makes possible an extremely simple operation when one operand is to be subtracted from another operand. The sign of the subtrahend does not materially alter the sequence employed. If a positive operand is to be subtracted from another positive operand, for example, the subtrahend should, in effect, be treated as a negative number. If a subtrahend is a negative quantity the subtrahend should be treated as a positive number for purposes of the subtraction operation. The location of the subtrahend is indicated by the value of the *c* bit (*c*(0) meaning that the subtrahend is on the left side), as stated above. The value of the *c* bit is employed during the first RIC cycle to reverse the state of one of the minus multivibrators MIL 124 and MIR 172. If a minus sign has previously been stored in the minus multivibrator, therefore, the multivibrator is switched to a "0" output so that the system operates as with a positive quantity. Conversely, with a positive quantity the minus multivibrator is set for the first time by the output of the coupled G134 or G186. Note that after the first RIC cycle the system may enter an end-around-carry operation. Following end-around-carry all steps are those of addition, so that only an A signal is provided. Accordingly, after an RD cycle G134 and G186 are not operated.

As is now understood, the nature of the arrangement is such that reversal of the state of a minus multivibrator will, without more, condition the arrangement for addition or subtraction, as desired. The same units are employed in successive steps, but in different fashions.

Another addition situation which may be encountered is the addition of a negative operand on the left side to a positive operand on the right side. The detailed example given effectively covers this situtaion, because the arrangement operates the same without regard for the position of addend and augend. So far as minus signs are concerned, the system operates symmetrically. When both operands are negative quantities and the operation is to be addition, no complementation is needed but the sign of the result should be negative. In this situation the minus symbol is first stored as the sign of the result and the minus multivibrators are then reversed. Thus the operation is completed as the addition of two positive quantities. For this purpose G136 (Fig. 7C) recognizes the desired situation of coincidence of RIC, MIL(1), and MIR(1) signals, and provides an output at $tp_7$. The output of G136 applied through delay line 138, resets MIL 124 and MIR 172.

Other subtraction situations are properly disposed of because of the arrangements described above. The system provides for recognition of the sign of an operand and recognition of the operation which is to be carried out. The characters of the operand are complemented or not complemented depending upon the mathematical requirements of the situation. Handling of the operands then proceeds from status level to status level, with an end-around-carry being performed where necessary.

An end-around-carry occurs when it is necessary to replace the excess 1 derived from nines complementing a number. This is the course described above in connection with nines complementing. When only one complementation is carried out, the excess 1 must be replaced or accounted for in some manner. In the detailed example given above one operand is complemented before addition and a provisional minus is presumed for the result. The result was actually positive, however, and the end-around-carry was provided. Clearly, no end-around-carry will be involved when adding two positive numbers or two negative numbers or subtracting a negative number from a positive number. In these cases the result is, in absolute value, merely the sum of the two operands.

If the provisional minus assumed when only one of the operands is negative is actually correct, no end-around-carry is or need be made. For example, if the two following operands are to be added, the process is as follows by ordinary addition:

$$\begin{aligned}423\text{Sp} &= +423\\ 506\text{Mi} &= \underline{-506}\\ &\quad -\ 83 = \text{Sum}\end{aligned}$$

The equivalent operation carried out with the system described here is as follows:

$$\begin{aligned}&423\text{Sp} = 423\\ &506\text{Mi} = \underline{493}\quad \text{(Complemented)}\\ &\qquad 916- = \text{Sum}\\ &\qquad 916- = \text{(Complemented)} = 083- = \text{Final sum}\end{aligned}$$

As shown above, the operation proceeds by taking the nines complement of each character of the negative operand (506), assuming a negative result, adding the two operands, and placing the complement of each result character in the sum. The final result is a negative quantity. The end-around-carry is not needed in this situation because the negative quantity exceeds the positive quantity in the absolute value, and because the two nines complementing operations have in effect cancelled each other.

The above constitute the various numerical relationships which may occur in arithmetic operations. A further situation may be encountered, however, in which there may be no numerical characters in either of the two operands. To detect this special situation, the second IC gate 366 is employed in the status control circuits of Fig. 5. ISSL and ISSR signals, provided in the manner described above, prime the second IC gate 366. If these signals are provided during an RS cycle, in which the system is searching for numerical characters in the operands, the significance is that the operands have been exhausted without numerical characters having occurred. Therefore an IC signal is provided by setting the IC multivibrator 320.

Whereas the many possible arithmetic combinations have been described in some detail above, it should be pointed out that the verification system remains the same. That is, during each RI status level AOP1 and AOP2 are generated. During AOP1 the operand characters are individually added (or subtracted) (and converted if necessary to coded decimal) and stored in the adder output register. Next, during AOP2, the second half of an RI status level, the sum (or difference) is returned to storage (here the high speed memories HSMR and HSML). Simultaneously therewith, the complement of each of the original operands are added (or subtracted) and the resulting complement sum (or difference) compared with the complement of the original sum (or difference). No additional time is required and only a small amount of additional circuitry is utilized.

*V. Conclusion*

The features and advantages of this invention are numerous and will be apparent to those skilled in the art. A few of these are pointed out below by way of example.

Much of the same equipment which is used to provide the final result is also used to accept the complement of each of the original operands, perform the operation a second time with apparently different operands (to the adder) and by means of a comparator circuit, provide a second result which can be compared with the original result for equality. Not only is the sum checked, but the parity bit, and the remaining bits of the encoded character are also checked.

Some other advantages of this invention are that: (1) only one adder (and converter, if necessary) is required for total verification of the result. (2) Only one cycle of operation is required to perform the addition and verification thereof. (3) The comparator checking provides a fail-safe system, giving an output only when the answer is correct. (4) The adder circuits are self-checked by this scheme. Thus, if a gate is required to pass a binary one and this gate is not working, it effectively passes a binary zero into the adder. However, during the verification (second addition) a different gate is required to pass the complement of the previous binary one, which is now a binary zero. Since the final results that are compared depend upon the comparator complementing of both operands, which in this example has not occurred, the result does not compare and an alarm is given. In the alternative, if the inoperative gate output represents a binary zero, this malfunction will be detected since during the verification this gate is required to pass a binary one. (5) The comparator arrangement is easily recognized because the two results to be compared are either the binary complement or the nines complement of each other. By comparing the zero side of the adder output register to the output of the adder (or converter) on the second addition, a direct equality comparison is accomplished.

There has thus been provided a system for high speed verification of the addition and subtraction of variable non-standard, maximum length items. The system is conservative of equipment, provides a unique self-checking operation without the loss of time during a computing cycle.

What is claimed is:

1. An adder checking system for verifying the arithmetic result of two binary encoded operands comprising, in combination, means to selectively provide said operands or the binary complements of said operands, a binary adder responsive to said complementing means for providing said arithmetic result from said two operands, means responsive to the output of said binary adder to store said arithmetic result, said binary adder also being responsive to said complementing means for providing a second arithmetic result from the complements of said two operands, and means comprising an equality comparator to compare the complement of one of said results with the other of said results for equality.

2. An adder checking system for verifying the arithmetic result of two binary encoded operands comprising, in combination, means to register said operands and to selectively provide said operands or the binary complement thereof, means to selectively provide a carry bit or complement thereof, a binary adder responsive to said register means and to said carry bit providing means for providing said arithmetic result from said two operands and said carry bit, and means responsive to the output of said binary adder to register said arithmetic result, and to selectively provide said result or the binary complement thereof, said binary adder also being responsive to said register means and to said carry bit providing means for providing a second arithmetic result from the complements of said operands and said carry bit, and means to compare the complement of said stored result with said second result, whereby equality between said stored result and said second result indicates a correct stored result.

3. An adder checking system for verifying the arithmetic result of two binary coded operands comprising, in combination, register means having binary "1" and "0" output terminals for each bit of said operands; an adder; input gating means selectively coupling said binary "1" and "0" output terminals to said adder; means to provide a first timing pulse and a second timing pulse; output register means having binary "1" and "0" output terminals; a comparator; output gating means selectively coupling the output of said adder to said output register, and to said comparator; said input gating means, said adder, and said output gating means each being responsive to said first timing pulse to provide a first arithmetic result formed from said register means binary "1" output terminals to said output register means; said input gating means, said adder, and said output gating means each being responsive to said second timing pulse to provide a second arithmetic result from said register means binary "0" output terminals to said comparator; means responsive to said second timing pulse to couple the "0" output terminals of said output register to said comparator, said comparator being responsive to equality between the complement of said first arithmetic result appearing at said "0" outputs from said output register and said arithmetic result produced upon the occurrence of said second timing pulse.

4. The system as claimed in claim 3 wherein said register means comprise multivibrator registers and said gating means comprise "and" gates.

5. An adder checking system for verifying the arithmetic result of two binary coded decimal operands in excess three code and a carry bit comprising, in combination, multivibrator registers having binary "1" and "0" output terminals for each bit of said operands and a carry multivibrator having binary "1" and "0" output terminals; a three input adder; input gating means selectively coupling each of said register binary "1" and "0" output terminals to said adders; a converter responsive to the output of said adder; means to provide a first timing pulse and a second timing pulse; output register means having binary "1" and "0" output terminals; a comparator, output gating means selectively coupling the output of said converter to said output register and to said comparator; said input gating means, said adder, said converter and said output gating means each being responsive to said first timing pulse to provide a first arithmetic result from said register means binary "1" output terminals and said carry multivibrator binary "0" output terminal to said output register means; said input gating means, said adder, said converter, and said output gating means each being responsive to said second timing pulse to provide a second arithmetic result from said register means binary "0" output terminals and said carry multivibrator binary "1" output terminal to said comparator; and means responsive to said timing pulse to couple the binary "0" output terminal from said output register to said comparator, said comparator being responsive to equality between said "0" output terminals from said output register and said arithmetic result produced upon the occurrence of said second timing pulse.

6. A system for adding or subtracting two characters in binary code and verifying the arithmetic result comprising registers for each of said characters, a carry multivibrator for a carry bit, first means coupled to said registers and said multivibrator for selectively complementing each bit of a character and said carry bit, a binary adder responsive in successive time sequence to said registers and said carry multivibrator for providing a first result character and to said first complementing means for providing a second result character, an output register responsive to said adder for holding said first result character, second means coupled to said output register for selectively complementing each bit of a first result character, and a comparator responsive to the second result character from said adder and to said second complementing means.

7. A system for adding or subtracting two binary encoded characters and verifying the arithmetic result comprising registers for each of said characters, a carry multivibrator, a first plurality of coincidence gates coupled to said registers and said carry multivibrator for selectively complementing each binary bit of a character and said carry bit, a binary adder responsive to said first plurality of coincidence gates for providing in successive time sequence first and second result characters, said second result being the complement of said first result, an output register responsive to said adder for staticizing said first result character, a second plurality of coincidence gates coupled to said output register for selectively complementing each binary bit of a first result character, and a comparator responsive to the second result character from said adder and to said second plurality of coincidence gates, said second gates providing the complement of said first result character.

8. A system for adding or subtracting two binary encoded characters and verifying the arithmetic result comprising a plurality of multivibrators for each of said characters, a carry multivibrator for a carry bit, a first plurality of coincidence gates coupled to said multivibrators and said carry multivibrator for selectively complementing each binary bit of a character and said carry bit, a binary adder responsive sequentially to said first plurality of coincidence gates for providing a first result character from said character and said carry bit and a second result character, said carry bit from the complements of each said character and said carry bit, an output plurality of multivibrators responsive to said adder for staticizing said first result character, a second plurality of coincidence gates coupled to said output multivibrator for selectively complementing each binary bit of a first result character, and a comparator responsive to the second result character of said adder and to said second plurality of coincidence gates, said second gate providing the complement of said first result character.

9. A system for adding or subtracting pairs of binary coded decimal characters in an excess three code and verifying the arithmetic result comprising registers for each of said characters, a carry bit multivibrator, first means coupled to said registers and said carry multivibrator for selectively complementing each binary bit of a character and said carry bit, a binary adder responsive to said first complementing means, a converter responsive to said adder for providing in time sequence first and second binary coded decimal result characters, said second result being the complement of said first result, an output register responsive to said converter for holding said first result character, second means coupled to said output register for selectively complementing each binary bit of a first result character, and a comparator responsive to the second result character of said converter and to said second means, said second means providing the complement of said first result character.

10. A system for adding or subtracting pairs of binary coded decimal characters in an excess three code and verifying the arithmetic result comprising registers for each of said characters, a carry bit multivibrator, first plurality of coincidence gates coupled to said registers and said carry multivibrator for selectively complementing each binary bit of a character and said carry bit, a binary adder responsive sequentially to said first complementing means, a converter responsive to said adder for providing a first binary coded decimal result character from said characters and a secondary binary coded decimal result character from the complements of each said character and said carry bit, an output register responsive to said converter for holding said first result character, second plurality of coincidence gates coupled to said output register for selectively complementing each binary bit of a first result character, and a comparator responsive to the second result character of said converter and to said second of said gates, said second gates providing the complement of said first result character.

11. A system for adding or subtracting pairs of binary coded decimal characters in an excess three code and verifying the arithmetic result comprising a plurality of multivibrators for each of said characters, a carry bit multivibrator, first means coupled to said multivibrators and said carry multivibrator for selectively complementing each binary bit of a character and said carry bit, a binary adder responsive in time sequence to said first complementing means, a converter responsive in time sequence to said adder for providing a first result character from said characters and said carry bit and a second binary coded decimal result character from the complements of each said character and said carry bit, an output plurality of multivibrators responsive to said converter for staticizing said first result character, second means coupled to said output multivibrators for selectively complementing each binary bit of a first result character, and a comparator responsive to the second result character of said converter and to said second means, said second means providing the complement of said first result character.

12. A system for adding or subtracting in response to at least first and second sequential timing pulses, pairs of binary coded decimal characters in an excess three code and verifying the arithmetic result comprising registers for each of said characters, a carry bit multivibrator, first complementing means coupled to the output of said registers and said carry multivibrator for providing an uncomplemented output responsive to said first timing pulse and a complemented output responsive to said second timing pulse, a binary adder responsive to said first complementing means and to said first and second timing pulses, a converter responsive to said adder for providing first and second binary coded decimal result characters formed respectively from said complementing means outputs occurring during said first and second timing pulses, said second result character being the complement of said first result character, an output register responsive to said converter for staticizing said first result character, second means coupled to said output register and responsive to said second timing pulse for selectively complementing each binary bit of a first result character, and a comparator responsive to the second result character of said converter and to said second means, said second means providing the complement of said first result character.

13. In a system for operating arithmetically on pairs of binary coded decimal characters in an excess three code and verifying said operations, an arrangement for adding said pairs of characters or subtracting one of said characters of a pair from the other, said arrangement comprising register means having binary "1" and "0" output terminals for each digit of said characters, a carry multivibrator having binary "1" and "0" output terminals, an adder, coincidence gating means selectively coupling said register means binary "1" and "0" output terminals to said adder for providing complemented and uncomplemented inputs to said adder, said adder providing in time sequence a first result character and a complemented result character, a converter coupled to said adder for providing binary coded decimal result characters, output register means having a binary "1" and "0" output terminals for each digit of said result characters, output gating means coupled to the binary "1" and "0" output terminals of said output register for selectively providing complemented and uncomplemented outputs from said output register means, and comparator means for comparing said complemented result character to said complemented output from said output register means.

14. A system for adding or subtracting two binary encoded characters and verifying the arithmetic result comprising registers for each of said characters, a carry multivibrator adapted to provide a carry bit input, a first plurality of coincidence gates coupled to said registers and said carry multivibrator for selectively complementing each binary bit of a character and said carry bit, a binary adder responsive to said first plurality of coincidence gates for providing in time sequence first and second result characters, said second result being the complement of said first result, an output register, a comparator, a second plurality of coincidence gates selectively coupling said first result character to said output register and said second result character to said comparator, and a third plurality of coincidence gates for selectively complementing each binary bit of said first result character, said third plurality of coincidence gates coupling said output register to said comparator, whereby said comparator indicates equality between said second result and said complemented first result to verify the addition or subtraction.

15. A system for adding or subtracting two binary encoded characters and verifying the arithmetic result comprising registers for each of said characters, a carry multivibrator adapted to provide a carry bit input, a first plurality of coincidence gates coupled to said registers and said carry multivibrator for selectively complementing each binary bit of a character and said carry bit, a binary adder responsive to said first plurality of coincidence gates for providing in time sequence first and second result characters, said second result being the complement of said first result, a converter coupled to said adder for providing binary coded decimal result characters, an output register, a comparator, a second plurality of coincidence gates selectively coupling said first result character to said output register and said second result character to said comparator, a third plurality of coincidence gates coupled to said output register for selectively complementing each binary bit of the first result character, said third plurality of coincidence gates coupling said output register to said comparator, whereby said comparator indicates equality between said second result and said complemented first result to verify the addition or subtraction.

16. A system for adding or subtracting pairs of binary coded decimal characters in an excess three code and verifying the arithmetic result comprising registers for each of said characters, a carry bit multivibrator, first means coupled to said registers and said carry multivibrator for selectively complementing each binary bit of a character and said carry bit, a binary adder responsive to said first complementing means, a converter responsive to said adder for providing in time sequence first and second binary coded decimal result characters, said second result being the complement of said first result, a parity generator responsive to the output of said converter for providing a parity bit, an output register responsive to said converter and to said parity generator for holding said first result character including said parity bit, second means coupled to said output register for selectively complementing each binary bit of a first result character including the parity bit, and a comparator responsive to the second result character of said converter and said parity generator and to said second means, said second means providing the complement of said first result character including the parity bit.

17. A system for adding or subtracting pairs of binary coded decimal characters in excess three code and verifying the arithmetic result, said code comprising six binary bits and a parity bit, said system comprising a three input adder, means providing in successive time sequence to said adder both the pairs of characters to be added and a carry bit, first in uncomplemented and second in complemented form, a converter responsive to said adder for providing uncomplemented and complemented binary coded decimal results respectively, a parity generator responsive to said converter for providing said parity bit to form first and second result characters respectively, and means responsive to said converter and to said parity generator to compare the complement of said first result character to said second result character for equality.

18. A system for adding or subtracting pairs of binary coded decimal characters in excess three code and verifying the arithmetic result, said code comprising six binary bits and a parity bit, said system comprising a three input adder, means providing in successive time sequence to said adder both the pairs of characters to be added and a carry bit, first in uncomplemented and second in complemented form, a converter responsive to said adder for providing uncomplemented and complemented binary coded decimal arithmetic results respectively, a parity generator responsive to said converter for providing said parity bit to form first and second result characters respectively from said uncomplemented and said complemented result characters, respectively, coincidence gating means for providing the $2^4$ and $2^5$ bits respectively to complete said first and said second result characters respectively, and means responsive to said converter, said parity generator, and said coincidence gating means to compare the complement of said completed first result character to said completed second result character for equality, whereby said result character is available for utilization during said verification comparison.

19. A system for adding or subtracting pairs of binary coded characters and verifying the arithmetic result, said code comprising at least 6 binary bits and a parity bit, said system comprising a three input adder, means providing in successive time sequences to said adder, both the pairs of characters to be added and a carry bit, first in uncomplemented and second in complemented form, a parity generator responsive to said adder for providing said parity bit to complete a first and a second result character respectively corresponding to said uncomplemented and complemented inputs to said adder, respectively, and means responsive to said adder and to said parity generator to compare the complement of said first result character to said second result character for equality.

20. The system as claimed in claim 19 which includes a utilization device and wherein said comparison means includes an output register, said utilization device being responsive to said output register to receive said first result character simultaneously with said equality comparison.

21. The system as claimed in claim 20 wherein said means includes means for providing an alarm signal in the event of inequality between the complement of said first result character and said second result character.

References Cited in the file of this patent

UNITED STATES PATENTS

| | | |
|---|---|---|
| 2,512,038 | Potts | June 20, 1950 |
| 2,634,052 | Bloch | Apr. 7, 1953 |
| 2,674,727 | Spielberg | Apr. 6, 1954 |

OTHER REFERENCES

Progress Report #2 on the EDVAC, Moore School of E. E., University of Pennsylvania, June 30, 1946. (Declassified, February 13, 1947), pages 1–4–3 to 1–4–7 and Fig. PY–0–216.